(12) United States Patent
Fujisawa

(10) Patent No.: US 8,272,953 B2
(45) Date of Patent: Sep. 25, 2012

(54) GAME MACHINE, GAME PROGRAM AND STORAGE MEDIUM HAVING PROGRAM THEREIN

(75) Inventor: Jin Fujisawa, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 436 days.

(21) Appl. No.: 12/569,175

(22) Filed: Sep. 29, 2009

(65) Prior Publication Data

US 2010/0081504 A1    Apr. 1, 2010

(30) Foreign Application Priority Data

Oct. 1, 2008    (JP) .................. 2008-256172

(51) Int. Cl.
*A63F 13/00* (2006.01)
*A63F 9/24* (2006.01)
(52) U.S. Cl. ................. 463/31; 463/42; 463/43
(58) Field of Classification Search ........... 463/43
See application file for complete search history.

(56) References Cited

U.S. PATENT DOCUMENTS

| | | | |
|---|---|---|---|
| 6,042,477 A * | 3/2000 | Addink | 463/42 |
| 7,503,006 B2 * | 3/2009 | Danieli | 715/751 |
| 7,803,054 B1 * | 9/2010 | Ogus et al. | 463/42 |
| 7,854,657 B2 * | 12/2010 | Shiraiwa | 463/42 |
| 7,862,433 B2 * | 1/2011 | Sato et al. | 463/42 |
| 2005/0075885 A1 * | 4/2005 | Danieli | 704/276 |
| 2005/0245317 A1 * | 11/2005 | Arthur et al. | 463/42 |
| 2006/0287096 A1 * | 12/2006 | O'Kelley et al. | 463/42 |

FOREIGN PATENT DOCUMENTS

| | | |
|---|---|---|
| JP | H11-169559 | 6/1999 |
| JP | 2002-248271 | 9/2002 |
| JP | 2002-248273 | 9/2002 |
| JP | 2007-215751 | 8/2007 |
| JP | 2008-099906 | 5/2008 |

OTHER PUBLICATIONS

"Diablo II" computer game, published by Blizzard Entertainment, released on Jun. 29, 2000, as evidenced by the game manual, downloaded from www.replacementdocs.com, with an upload date of May 25, 2005.*
"Counter Strike" computer game, published by Microsoft Game Studios, (Xbox Version), as evidenced by the game manual downloaded from www.replacementdocs.com, with an upload date of Apr. 27, 2005.*

* cited by examiner

*Primary Examiner* — Arthur O. Hall
*Assistant Examiner* — Nicholas Ditoro
(74) *Attorney, Agent, or Firm* — Duane Morris LLP

(57) ABSTRACT

When a cooperation game starts in a host game machine and a guest game machine that have been separately executed standalone games, present information (time and position of character) of the guest game machine is changed into one of the host game machine. During the cooperation game, present information of the guest game machine and the host game machine are renewed, being synchronized with each other. Then, player characters of the guest game machine and the host game machine are displayed on a display of each game machine, and each player plays the cooperation game together with the player character of the other game machine which is displayed on one's own game machine.

6 Claims, 9 Drawing Sheets

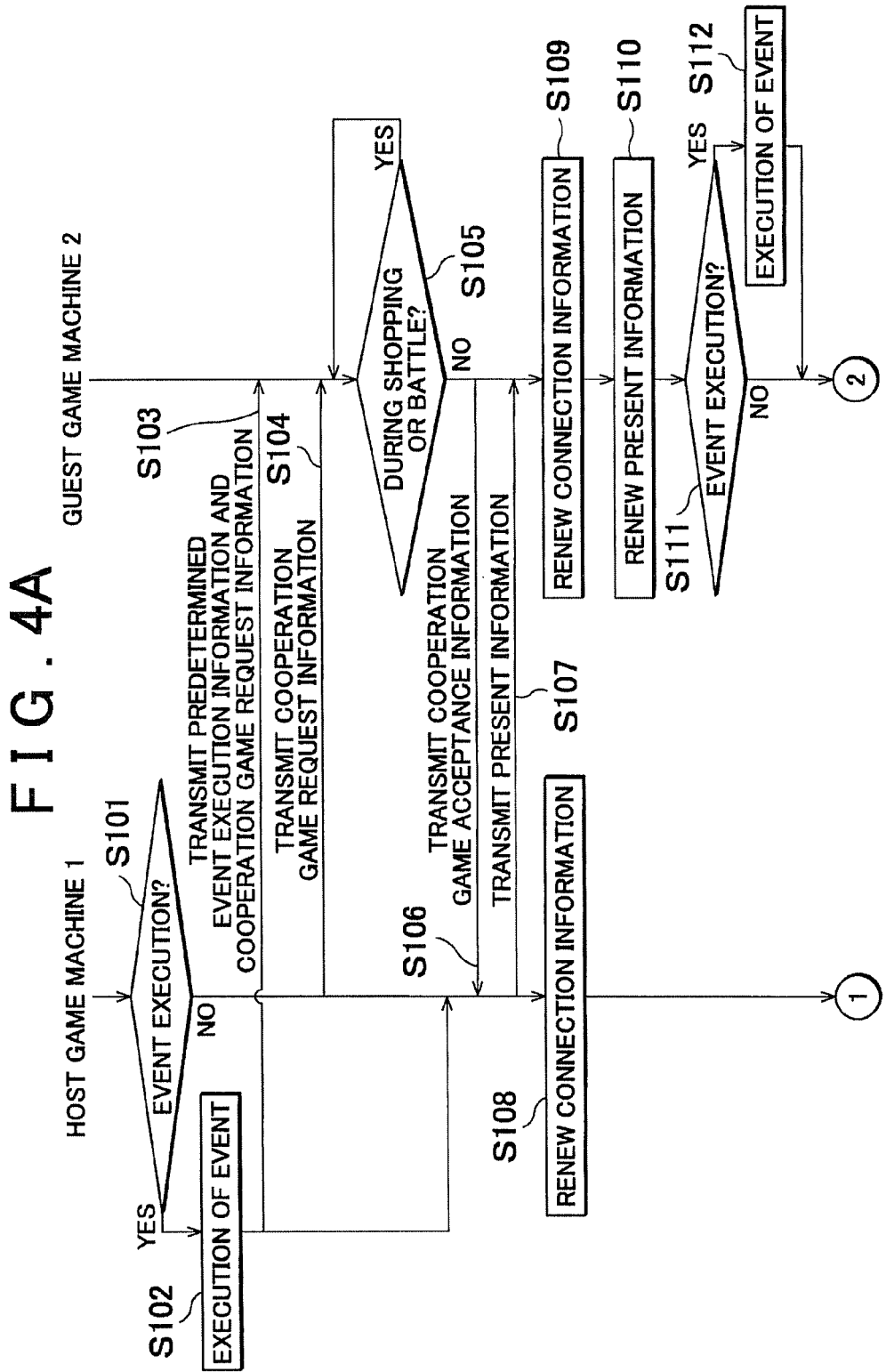

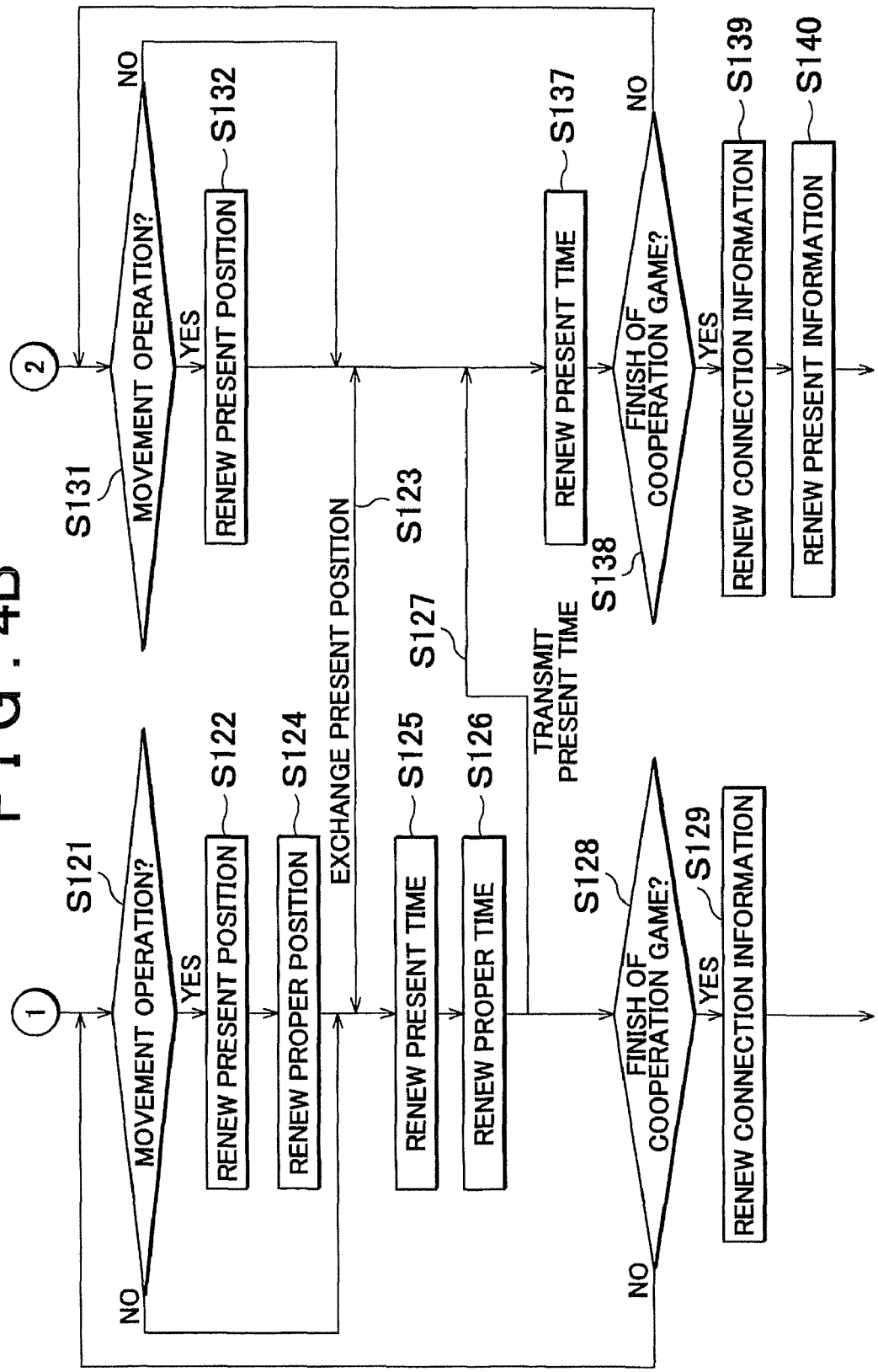

AT TIME OF STANDALONE GAME

HOST GAME MACHINE 1 — 22-1

- SECTION 3 CHAPTER 2·NOON·PM1 — 402-1
- SECTION 3 CHAPTER 2·NOON·PM1 — 403-1
- FIELD·X123:Y56 — 404-1
- FIELD·X123:Y56 — 405-1
- LEVEL:12  EXPERIENCE VALUE:2564 — 411-1

GUEST GAME MACHINE 2 — 22-2

- SECTION 4 CHAPTER 3·NIGHT·PM7 — 402-2
- SECTION 4 CHAPTER 3·NIGHT·PM7 — 403-2
- TOWN A·X32:Y40 — 404-2
- TOWN A·X32:Y40 — 405-2
- LEVEL:19  EXPERIENCE VALUE:8926 — 411-2

AT TIME OF COOPERATION GAME

HOST GAME MACHINE 1 (22-1)

| | |
|---|---|
| 402-1 | SECTION 5 CHAPTER 2·NIGHT·PM9 |
| 403-1 | SECTION 5 CHAPTER 2·NIGHT·PM9 |
| 404-1 | TOWN C·X16:Y33 |
| 405-1 | TOWN C·X16:Y33 |
| 411-1 | LEVEL:15 EXPERIENCE VALUE:4239 |

COMMON USE → 503

GUEST GAME MACHINE 2 (22-2)

| | |
|---|---|
| 402-2 | SECTION 4 CHAPTER 3·NIGHT·PM7 |
| 403-2 | SECTION 5 CHAPTER 2·NIGHT·PM9 |
| 404-2 | TOWN A·X32:Y40 |
| 405-2 | TOWN C·X20:Y29 |
| 411-2 | LEVEL:21 EXPERIENCE VALUE:10601 |

GAME MACHINE, GAME PROGRAM AND STORAGE MEDIUM HAVING PROGRAM THEREIN

CROSS REFERENCE TO RELATED APPLICATION

The present disclosure relates to subject matter contained in Japanese patent application No. 2008-256172 filed on Oct. 1, 2008, the disclosure of which is expressly incorporated herein by reference in its entirety.

FIELD OF INVENTION

This invention relates to a game machine and game program for advancing a game in cooperation with two or more game machines by mutually connecting such game machines after separately advancing respective games by the respective game machines, and a storage medium having the program therein.

BACKGROUND OF THE INVENTION

A network game has been played by two or more players in a common virtual space with game machines connected with a network. In order to actualize the network game, an environment for unifying results of processes between the machines which participate in the network game is necessary since the network game is played between the machines that physically separate from each other.

When playing the network game, a server periodically synchronizes with the respective game machines so that timing of the processes is unified in a common game progress between the respective game machines. By doing so, generation of discrepancy on the game progress, such as time series lag in a common game progress to be executed between the respective game machines, is avoided (see Japanese patent application publication No. 2008-99906).

The network game is actualized by using a common virtual space and locating two or more player characters to be operated by two or more players in such a space. For example, the player starts the game after locating one's own player character in the virtual space that is also used for the players in the other game machines. The player can play the network game with the other player if the player character of the other player participates in the common virtual space prepared in advance. (see Japanese patent application publication No. 2002-248273).

Documents to be disclosed for the invention are Japanese patent application publication No. 2008-99906 (paragraph 0008) and Japanese patent application publication No. 2002-248273 (paragraphs 0031 and 0032).

DISCLOSURE OF INVENTION

Problems to be Solved

There is a game to be played with the player characters to be basically used in a standalone game by peer-to-peer connection between two or more game machines. In such a game, the player characters used in the standalone games do not battle each other, for example. That is, such game has no time conception on the game progress.

On the other hand, in case of the network game to be uniformly controlled by a server, a discrepancy of game situation does not occur even if two or more player characters exist in the same game space since the server controls a space and a time conception. If there is no arrangement for uniformly controlling the game (there is no arrangement in case of peer-to-peer connection from standalone), a discrepancy may occur in the situation of the game when the player characters of the different players exist in the same space.

An object of the invention is to provide a game machine and the like, for controlling not to generate a discrepancy of the game situation between the respective game machines when advancing the game in cooperation with the game machines by mutually connecting such game machines after separately advancing the respective games by the game machines.

SUMMARY OF THE INVENTION

A first aspect of the invention is a game machine for playing a predetermined game individually or in cooperation with two or more game machines that are connected with each other so as to communicate therebetween, comprising:

virtual world producing means, for producing a virtual world for a game in a virtual space in a memory, space time parameter which is comprised of a world coordinate and a virtual time being set in said virtual world;

scenario advancing means, for advancing a scenario by moving a player character operable by a player in response to a signal from input means in said virtual world;

said scenario advancing means having standalone execution means and cooperation game execution means, said standalone execution means for executing a standalone game where said scenario of said game is advanced alone by said game machine, and said cooperation game execution means for executing a cooperation game where said scenario of said game is advanced in cooperation with one's own game machine and the other game machine connected with said one's own game machine so as to communicate with each other by exchanging game information between said game machine and said other game machine through mutual communication;

memory means, for storing a coordinate position of said player character in said virtual space and a virtual time at this point of time as present information;

present position renewal means, for computing said coordinate position of said player character in said virtual space during execution of said game and renewing said present information of said player character stored in said memory means;

character position transmitting means, for transmitting said coordinate position of said player character in said virtual space during execution of said cooperation game to the other game machine which is executing said cooperation game;

1) in a case where said game machine is a host game machine which requests the other game machine to execute said cooperation game at a time of execution of said cooperation game by said cooperation game execution means; said game machine further comprising:

request input means, through which an instruction to request said other game machine to execute said cooperation game is inputted;

cooperation request information producing and transmitting means, for producing cooperation request information based on said inputted instruction to request to execute said cooperation game and transmitting said information to two or more other game machines connected so as to communicate;

present information reading and transmitting means, for reading said coordinate position of said player character and said virtual time stored in said memory means at a first point of time when receiving cooperation game acceptance information showing acceptance of participation in said cooperation game from said other game machine and transmitting said read information to said other game machine;

first cooperation game advance switching means, for storing in a memory information showing that said game machine is executing said cooperation game with said other game machine from which said cooperation game acceptance information was returned, and switching said game machine from the last standalone game execution state into a cooperation game execution state;

first present time renewal means, for clocking said virtual time during execution of said cooperation game and renewing said present information stored in said memory means;

present time transmitting means, for transmitting said renewed virtual time to said other game machine which is executing said cooperation game;

2) in a case where said game machine is a guest game machine which participates in said cooperation game requested by said other game machine at a time of execution of said cooperation game by said cooperation game execution means; said game machine further comprising:

cooperation request information input display means, for receiving said cooperation request information transmitted from said other game machine and displaying information showing that said cooperation request information was inputted by said other game machine on a display;

acceptance input means, through which an instruction of acceptance of participation in said cooperation game is inputted in response to said received cooperation request information of said cooperation game;

cooperation game acceptance information producing and returning means, for producing cooperation game acceptance information based on said inputted instruction of acceptance, and retuning said produced information to said other game machine;

virtual time renewal means, for renewing said present information of said memory means by said virtual time at said first point of time, which was received from said other game machine to which said cooperation game acceptance information was transmitted;

other machine present position renewal means, for storing said coordinate position of said player character of said other game machine at said first point of time which is transmitted by said present information reading and transmitting means at a time of execution of said cooperation game, in said memory means as other machine present information, and renewing said other machine present information based on said coordinate position of said player character of said other game machine which is transmitted from character position transmitting means of said other game machine during execution of said cooperation game;

character position setting means, for computing and setting a coordinate position where said player character of said game machine should be displayed in said cooperation game based on said coordinate position of said player character of said other game machine at said first point of time, and for storing said computed position in said present information in said memory means;

second cooperation game advance switching means, for storing in said memory information showing that said game machine is executing said cooperation game with said other game machine to which said cooperation game acceptance information was transmitted, and switching said game machine from the last standalone game execution state into said cooperation game execution state; and second present time renewal means, for renewing said present information stored in said memory means based on said virtual time which is transmitted from said present time transmitting means of said other game machine;

wherein said cooperation game execution means displays both player characters of said host game machine and said guest game machine which participate in said cooperation game on said displays of said game machines based on said respective coordinate positions of said present information and said other machine present information, and thereafter said player character of said game machine is controlled in its position to be displayed based on said present information and said player character of said other game machine is controlled in its position to be displayed based on said other machine present information, and controls said virtual time in said cooperation game based on said present information.

In the above-mentioned game machine, each of two or more game machines can advance a game through the standalone execution means independently from the other game machines, and the game can be also advanced in cooperation with two or more game machines by communication connection through the cooperation game execution means. Data to be changed in each game machine according to the game progress includes data regarding space time parameters, such as the world coordinate position of the player character in the game world and the virtual time. In a case where the cooperation game is advanced in such a state that data regarding space time parameters are different from each other among two or more game machines, differences occur among the game machines in the progress of the game.

On the contrary, when the game is advanced in cooperation with two or more game machines, data regarding the virtual time stored in the memory means of the host game machine is transmitted from the host game machine to the guest game machine and the virtual time stored in the memory means of the guest game machine is changed into one of the host game machine. By doing so, when two or more game machines advance the game in cooperation with these game machines each of which has advanced the game irrespective of the other game machine, it is possible to play the cooperation game, corresponding the virtual time with each other among two or more game machines, and there is no difference among the respective game machines in the game progress thereby.

Besides, the world coordinate position of the player character which comprises the space time parameter is similar to the above-mentioned. Each game machine transmits the coordinate position of the player character of one's own game machine to the other game machine which executes the cooperation game through the character position transmitting means, and each game machine renews the coordinate position of the player character of the other game machine in the memory means based on the coordinate position of the player character of the other game machine which is transmitted from the other game machine which executes the cooperation game through the other machine present position renewal means. Therefore, it is possible to play the cooperation game, corresponding to the world coordinate positions of the player characters of the respective game machines that are connected so as to communicate. Then, it is possible to display two or more player characters displayed on the display of each game machine on the same world coordinate positions in all game machines, and there is no difference among the respective game machines in the game progress thereby.

Two or more game machines can advance the cooperation game through the cooperation game execution means by peer-to peer connection with no intervention of the server excluding two or more game machines. Besides, each game machine can also advance the game standalonely through the standalone execution means without connecting with any other game machine.

Besides, the virtual game time of the guest game machine, that is, the virtual time and the virtual game time of the host game machine are unified each other through the first and second present time renewal means when the game advances by the cooperation game execution means. Then, even if the virtual game time (the virtual time) of the guest game machine which advances through the standalone execution means is different from the virtual game time (the virtual time) of the host game machine, there is no difference between both game machines in the game progress of the cooperation game, and the respective players can play without having feeling of physical disorder.

In addition, a second aspect of the invention is the game machine, further comprising:

cooperation game finish judging means, for judging as to whether or not said cooperation game finished;

in a case where said game machine is said guest game machine which participates in said cooperation game requested by said other game machine:

space time parameter storing means for storing said coordinate position of said player character and said virtual time of said game machine in said standalone game execution state just before transfer of said game machine into said cooperation game execution state through said second cooperation game progress switching means; and loading means, for loading said coordinate position of said player character and said virtual time just before transfer stored in said space time parameter storing means into said memory means as said present information in a case where said cooperation game judging means judged finish of said cooperation game;

wherein said standalone execution means advances said game scenario after finish of said cooperation game based on said present information into which said coordinate position of said player character and said virtual time just before transfer have been loaded.

According to this aspect of the invention, the progress of the standalone game through the standalone execution means after finish of the cooperation game by the cooperation game execution means in the guest game machine can be restarted from the situation just before transfer into the cooperation game execution means, so that the player of the guest game machine can assist the game progress of the player of the host game machine which advances in the host game machine without receiving an influence from the other player in one's own game progress.

In addition, a third aspect of the invention is the game machine, wherein said character position setting means sets a coordinate position where said player character of said game machine should be displayed in said cooperation game near said coordinate position of said player character transmitted from said other game machine.

According to this aspect of invention, the player character of the guest game machine can be moved near the position of the player character of the host game machine on the map when the game advances through the cooperation game execution means. Then, it is possible to display both player characters of the guest game machine and the host game machine on the positions that are close to each other on the world coordinates even if the coordinate position of the player character of the guest game machine separates from the coordinate position of the player character of the host game machine in the virtual world when the game progress is the standalone execution means. Then, the player of the guest game machine is possible to cooperate with the player of the host game machine in the game progress.

In addition, a fourth aspect of the invention is the game machine, further comprising:

in a case where said game machine is said guest game machine which participates in said cooperation game requested by said other game machine:

participation ability judging means for judging as to whether or not said game machine is possible to participate in said cooperation game as said guest game machine at a present stage, and realtimely storing an ability of participation as a participation ability flag; and display postponing means for controlling to postpone a display of such information that said cooperation request information has been inputted on said display through said cooperation request information input display means until said participation ability flag is rewritten in "YES" in a case where said participation ability flag is "NO".

According to the above-mentioned structure, the guest game machine can play the game without receiving unexpected matters in a case of the participation in the cooperation game since the display of such information that the cooperation request information has been inputted from the host game machine on the display is postponed until the participation ability flag of the guest game machine is rewritten in "YES".

In addition, a fifth aspect of the invention is the game machine, further comprising:

memory means, for storing an event execution flag showing whether or not said game machine is executing a predetermined game event according to said game scenario;

1) in a case where said game machine is said host game machine which requests said other game machine to execute said cooperation game:

event judging means, for judging as to whether or not said game machine is executing said predetermined event by referring to said event execution flag in said memory means when said cooperation request information producing and transmitting means transmits said cooperation request information to said other game machine;

wherein said cooperation request information producing and transmitting means can transmit predetermined event execution information together with said cooperation request information in a case where said event judging means judged that said game machine is executing said predetermined event;

2) in a case where said game machine is said guest game machine which participates in said cooperation game requested by said other game machine:

event executing means for controlling to execute said predetermined event based on said predetermined event execution information inputted from said other game machine also in said game machine when said second cooperation game advance switching means switches said game machine from the last standalone game execution state to said cooperation game execution state.

Generally, events assist player's understanding in the game progress. In case of the cooperation game, the same event almost concurrently occurs in both host game machine 1 and the guest game machine 2 through the event execution means. Therefore, both players of the host game machine and the guest game machine equally understand the game, and the scenario of the cooperation game can be smoothly developed in both host game machine and the guest game machine under equal conditions thereby.

BRIEF DESCRIPTION OF THE DRAWINGS

FIG. 4 is a flowchart showing processes of a host game machine 1 and a guest game machine 2 at the time of transfer between a standalone game and a cooperation game.

BEST MODE FOR CARRYING OUT THE INVENTION

An embodiment of the invention is now mentioned, referring to appended drawings.

Firstly, a game machine to be used in a game system in this embodiment is mentioned. Generally, a game is basically standalonely advanced by one player in the game system in the embodiment, but may be progressed in cooperation with two or more game machines that are mutually peer-to-peer connected through wireless communication. However, the game can be finished only with the standalone.

In the following descriptions, a game that advances in a standalone form is referred to as "a standalone game" and a game which advances under a cooperation between two or more game machines is referred to as "a cooperation game". The players who play the cooperation game are promoter ("the host player" hereinafter) and participants ("the guest players" hereinafter). The game machine of the host player is referred to as "host game machine" and the game machine of the guest player is referred to as "the guest game machine".

Figure 1:
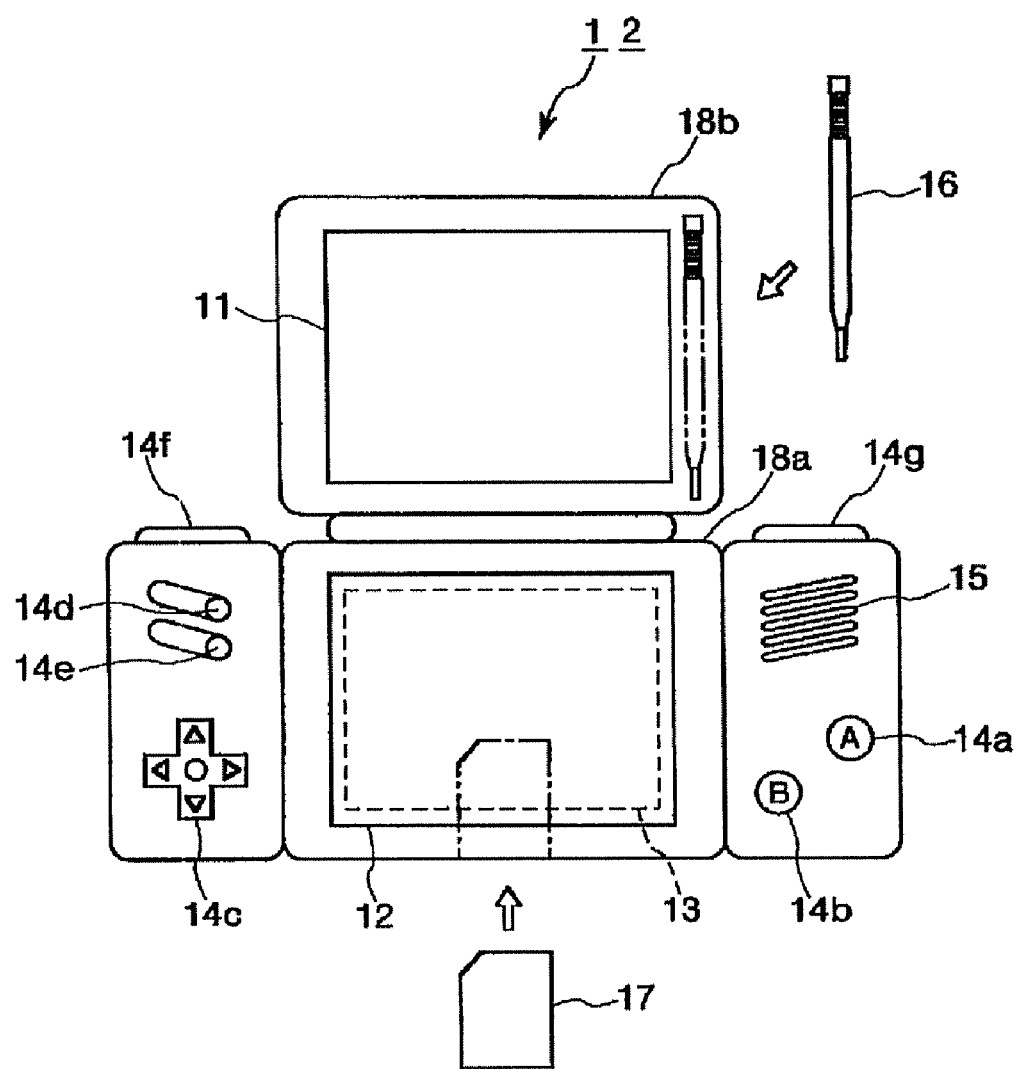
FIG. 1 is a view showing an example of appearances of a game machine to be used in a game system in an embodiment of the invention.

FIG. 1 is a view showing appearances of a host game machine 1 or a guest game machine 2 (both are referred to as only "game machines" hereinafter if both are not differentiated from each other) to be applied in a game system in this embodiment. In this embodiment, the host game machine 1 and the guest game machine 2 are computers, and are game machines having the same structure. As shown in the figure, each of the game machines 1, 2 is stored in a housing 18, having liquid crystal displays (LCDs) 11, 12 located in predetermined positions.

In such a case where the first liquid crystal display ("the LCD" hereinafter) 11 and the second LCD 12 are located in an up/down direction, the housing 18 is comprised of a lower housing 18*a* and an upper housing 18*b*, and the upper housing 18*b* is on the lower housing 18*a* and is rotatably supported thereby. The upper housing 18*b* has a plane shape slightly bigger than one of the first LCD 11, and has an opening so as to expose a display screen of the first LCD 11 from a main face. The lower housing 18*a* is formed such that its plane shape is longer than the upper housing 18*b* in a lateral direction, an opening for exposing the display screen of the second LCD 12 is formed at almost center portion in the lateral direction. And, a hole for outputting sounds from a speaker 15 is formed at one of both connecting with the second LCD 12, and an operational switch portion 14 is installed on both, right portion and left portion, connecting with the second LCD 12 as an input portion.

The operational switch portion 14 includes an action switch (refereed to as "A button" hereinafter) 14*a*, an action switch ("B button" hereinafter) 14*b* which are installed on the lower housing 18*a* on a right side of the second LCD 12, a direction indicator switch (cross key) 14*c*, a start switch 14*d*, a selection switch 14*e* which are installed on the lower housing 18*a* on a left side of the second LCD 12, and side switches 14*f* and 14*g*.

The A button 14*a* and the B button 14*b* are used for inputting predetermined instructions of a player or inputting instructions for renewing messages shown on the LCD 11, 12 and displaying renewed messages. The direction indicator switch 14*c* is used for inputting movement directions of a player character operable by the player through the operational switch portion 14 or a cursor. The direction indicator switch 14*c* is a cross key, through which total four directions, up, down, right and left directions can be inputted. The side switch 14*f* ("the L button" hereinafter) and the side switch 14*g* ("the R button" hereinafter) are provided on both right and left portions of an upper face (upper side) of the lower housing 18*a*.

A tough panel 13 (area shown with a broken line in FIG. 1) is installed on the upper face of the second LCD 12. Any type of touch panel, such as a resistive one, optical one (infrared one), a capacitive one, is available as the touch panel 13, and such touch panel 13 can detect a coordinate position of a stick 16 by pressing its upper face through a stick 16 (or a finger), moving the stick 16 on the upper face or touching the upper face through the stick and can output the coordinate position. The touch panel 13 is used for inputting predetermined instructions.

A storage hole for storing the stick 16 through which the touch panel 13 can be operated if necessary (area shown with a two-dot chain line in FIG. 1) is formed near the side of the upper housing 18*b*. In such a storage hole, the stick 16 is stored. A cartridge insertion (area shown with a dashed line in FIG. 1) for attachably and detachably installing a game cartridge 17 (only "the cartridge 17" hereinafter) including a memory that stores game program, such as a ROM, is formed at the side of the lower housing 18*a*. The cartridge 17 is an information storage medium for storing game program, and a nonvolatile semiconductor memory, such as a ROM and a flash memory, is used as the cartridge 17. A connector (see FIG. 2) that electrically connects with the cartridge 17 is built in an inside of the cartridge insertion. In addition, an electronic circuit substrate, which mounts various kinds of electronic parts, such as a CPU, thereon is stored in the lower housing 18*a* (or may be in the upper housing 18*b*).

Figure 2:
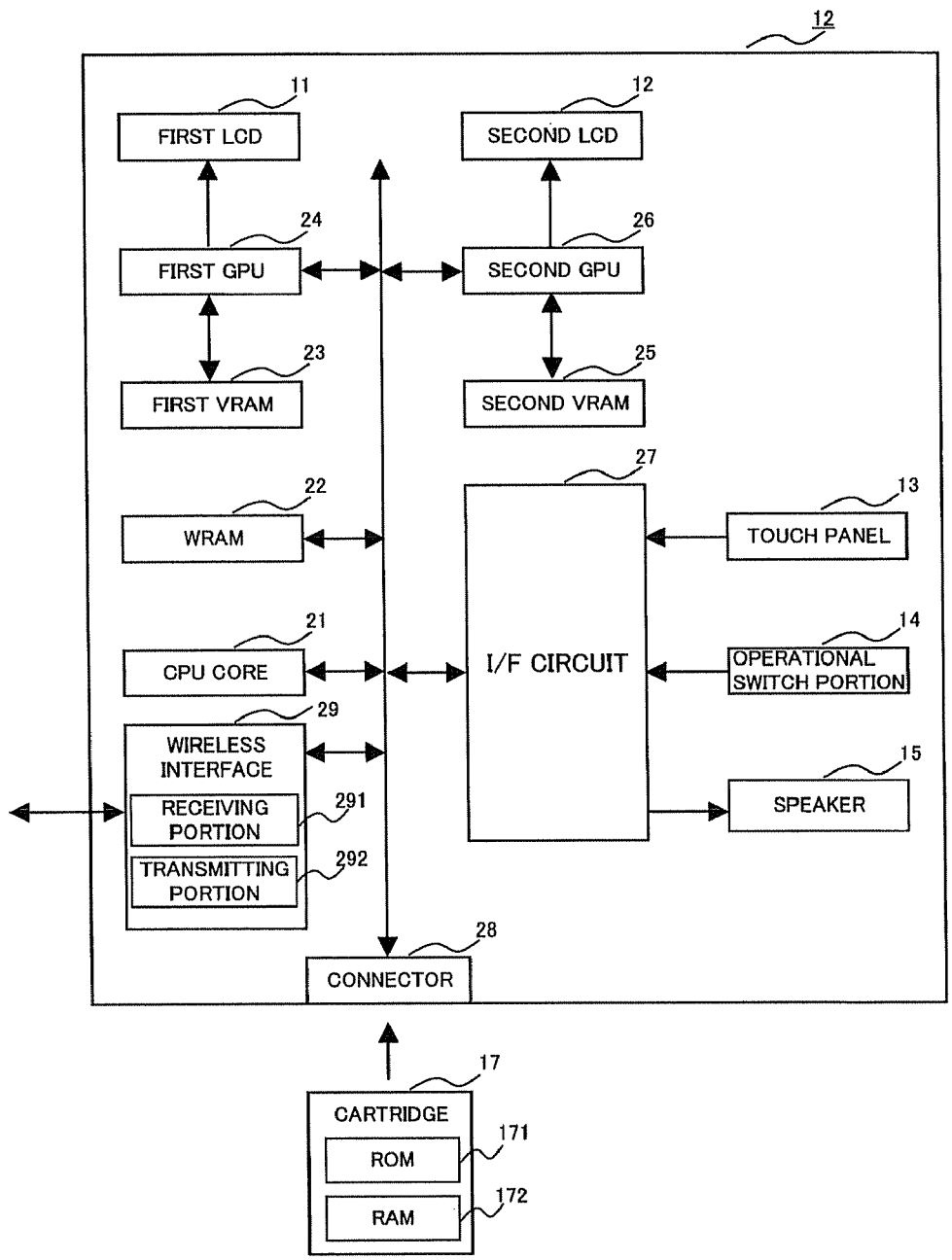
FIG. 2 is a block diagram showing a structure of the game machine to be used in the game system in the embodiment of the invention.

A structure of a circuit of the game machine 1 or 2 is now mentioned. FIG. 2 is a block diagram showing the structure of the circuit of the game machine 1 or 2. In FIG. 2, a CPU core 21 is mounted on the electronic circuit substrate stored in the housing 18. A connector 28 for connecting the cartridge 17 is connected with the CPU core 21 through a predetermined bus, and an input/output interface (I/F) circuit 27, a first graphics processing unit (the first GPU) 24, a second graphics processing unit (the second GPU) 26, a working RAM (WRAM) 22 and a wireless interface 29 are connected with the CPU core 21.

The cartridge 17 is attachably and detachably connected with the connector 28. As mentioned before, the cartridge 17 is a storage medium for storing game program, and concretely speaking, the cartridge 17 stores a ROM 171 for memorizing game program and a RAM 172 for rewritably memorizing backup data. The UPU core 21 executes the game program memorized in the ROM 171 of the cartridge 17. The WRAM 22 stores temporary data obtained by executing the game program and data for producing images. The ROM 171 stores programs that are groups of instructions and groups of data executable by the computer, such as the game machines 1 and 2, especially by the CPU core 21. Such game program is read by the WRAM 22 and is executed.

Upon receipt of an instruction from the CPU core 21 according to the game program, a three-dimensional virtual space is produced in the WRAM 22, and a virtual world for a game is produced in such a way that a player character operable by a player, many characters and objects that are backgrounds, such as towns and dungeons, are produced and located in the produced three-dimensional virtual space. The three-dimensional virtual space where various kinds of objects were thus located is rendered through a virtual camera located in a predetermined position so as to obtain a two-dimensional image, and the obtained two-dimensional image is displayed on a display, such as the LCDs 11 and 12. In such a case, the game program and the CPU core 21 are virtual world producing means.

A world coordinate system is set in the virtual world for this game, and a scenario (event) of the game is executed at a proper position on the world coordinate system according to its development. In other words, all areas where the character can act in the virtual world for the game are controlled by such a world coordinate system, and when the CPU core 21 designates the world coordinate through the game program, an optional object including the player character can be located on the designated world coordinate system.

In addition, the CPU core 21 sets a virtual time (such as year, season and time) that is proper in the virtual world in the virtual world for the game according to the game program, and the time in the virtual world is properly controlled through the game program such that the scenario is advanced so as to have reality similar to the actual world. In this case, the game program and the CPU core 21 are scenario advancing means.

As mentioned before, the world coordinate system and the virtual time that are set in the virtual world of the game are closely connected with the scenario developments of the game program, and each scene in the scenario, including an event scene as mentioned later, has space-time parameter information having two elements, the world coordinate system and the virtual time as attribution information. Therefore, by properly designating the world coordinate system and the virtual time of the space-time parameter information, the CPU core 21 can produce a specific scene of a corresponding stage in the scenario inside the three-dimensional virtual space of the virtual world. These space-time parameters are realtimely stored in a predetermined memory (such as the WRAM 22) as present information of the player character as the scenario advances in the virtual world by playing the game by the player. Whenever the player character spends a time in the virtual world and moves in the space, the CPU core 21 realtimely renews and stores the virtual time at the time when the player character spends the time in the virtual world and the world coordinate at such a time as present information of the game at such a time in a memory according to the game program.

A first video RAM ("the VRAM" hereinafter) 23 is connected with the first GPU 24, and a second VRAM 25 is connected with the second GPU 26. Upon receipt of the instruction from the CPU core 21 according to the game program, the first GPU 24 produces various kinds of the first game images including the game image obtained by rendering of the three-dimensional virtual space and draws the obtained images in the first VRAM 23. According to the instruction from the CPU core 21, the second GPU 26 produces various kinds of the second game images including the game image obtained by rendering of the three-dimensional virtual space and draws the obtained images in the second VRAM 25. Two frames of the first VRAM 23 and two frames of the second VRAM 25 are prepared, and the VRAM for developing the image data and for reading the image data are alternately switched every one frame period (every $\frac{1}{30}$ second, for example). One of the images is obtained by executing perspective transformation on a common virtual space, such as a town, a dungeon and field, and a player character and non-player character in the common virtual space, through a virtual camera in the common virtual space for each frame.

The first GPU 24 is connected with the first LCD 11, and the second GPU 26 is connected with the second LCD 12. The first GPU 24 outputs the first game image drawn in the first VRAM 23 according to an instruction from the CPU core 21 to the first LCD 11. The first LCD 11 displays the first game image outputted from the first GPU 24. The second GPU 26 outputs the second game image drawn in the second VRAM 25 according to an instruction from the CPU core 21 to the second LCD 12. And, the second LCD 12 displays the second game image outputted from the second GPU 26.

The touch panel 13, the operational switch portion 14, and the speaker 15 are connected with the I/F circuit 27. The I/F circuit 27 is a circuit for exchanging data between the CPU core 21 and an external input-output device, such as the touch panel 13, the operational switch portion 14 and the speaker 15. The speaker 15 is located inside the hole for outputting sounds, and outputs voices and sounds to be produced by the game during execution.

The touch panel 13 (including a device driver for the touch panel) has a coordinate system corresponding to one of the second VRAM 25, and outputs coordinate date corresponding to position inputted (instructed) through the stick 16 or the like) to a predetermined register provided in the WRAM 22. Resolution of the display screen of the second LCD 12 is 256 dot×192 dot, and accuracy of detection of the touch panel 13 is also 256 dot×192 dot corresponding to the display screen. The accuracy of detection of the touch panel 13 may be lower or higher than one of the display screen of the second LCD 12.

The wireless interface 29 exchanges information with the external device, such as the other game machine, a desktop game machine and a server. The game machines 1 and 2 connect with the other game machine that is in a predetermined area from the wireless interface 29 by Peer-to-Peer form and exchange information therebetween. That is, two or more game machines inside a predetermined area can communicate with each other without a server.

The wireless interface 29 includes a receiving portion 291 for receiving information transmitted from the other game machines 1 and 2 and a transmitting portion 292 for transmitting information to the other game machines 1 and 2. The information received by the receiving portion 291 is stored in the WRAM 22 in order of receipt by control through a CPU in the wireless interface 29. The CPU core 21 sends the information that is necessary to be sent to the other game machines 1 and 2 to the wireless interface 29, and the transmitting portion 292 transmits the information received from the CPU core 21 to the other game machines 1 and 2 by control through a CPU of the wireless interface 29.

The information that the game machines 1, 2 receive and transmit includes transmission source information which shows the game machine 1 or 2 as a transmission source, and transmission destination information which shows the game machine 2 or 1 as a transmission destination, but the transmission destination information is not included therein when transmitting information addressed to an unspecified game machine. The transmission destination information, that is, the information to be transmitted from one game machine 1 or 2 to the other game machines 2 or 1, includes information showing the other game machines 2 or 1. The transmission source information and the transmission destination information can be identified, for example, the game machines 1 and 2 that are a transmission source and a transmission destination can be identified with individual identification numbers which are proper for the game machines.

Subsequently, the game to be executed in this embodiment is now more detailedly mentioned. The game to be applied in the embodiment is so-called RPG (role playing game), and is basically a standalone game, and two to four players participate and can play a cooperation game in the same scenario. As the game space (virtual space) to be used in this game, the virtual space of the standalone game becomes the virtual space of the cooperation game as it is.

Each player character can move on a map which is formed in the virtual space comprising the virtual world based upon signals outputted in response to an operation of the operational switch portion 14 (and/or touch panel 13) which is input means by a player through processing by the CPU core 21 according to the game program. The scenario of the game thus advances in the virtual world. Such a scenario has two or more scenes according to an area of the three-dimensional virtual space where the player character positions in the virtual world, and the game advances in such a way that after finishing one scene, a player moves to the other scene, for example. Respective scenes may have such limitations in their orders to be executed that scene B is not executed so long as scene A is not finished, or any of scene C and scene D may be firstly executed.

In the standalone game, a player operates one player character (may operate two or more player characters, but subsequent explanation is based on such a condition that one player character is operated by one player, for easy explanation). The standalone game individually advances along a game scenario in each game machine through the CPU core 21 according to the game program, and each game advancing situation does not receive an influence from the other individual game machines. In this case, the CPU core 21 that is executing, a task of advancing a game scenario in a standalone state according to a game program (standalone game) is standalone execution means. Such game advancing form is a conventional well-known game form.

When an advancing game transfers from the standalone game to a cooperation game, it is possible to play the game under cooperation of respective players. Playing the game under cooperation of respective players means the respective players battle an enemy by united efforts of the respective players and change items among the respective players in a state that the player character is located in the same virtual space. The standalone game is transferred to the cooperation game if a host player declares and the guest player participates in the game in response to such a declaration. In such a case, the CPU core 21 executes the cooperation game according to the game program in such away that game information is exchanged between one's own game machine and the other game machines by mutual communication between one's own game machine and the other game machines, and one's own game machine advances a game scenario in cooperation with the other game machines connected so as to communicate with one's own game machine. In this case, the CPU core 21 that is executing a task of advancing the game scenario in cooperation with the other game machines according to the game program is cooperation game execution means.

Exchange of information regarding transfer from the standalone game to the cooperation game is now mentioned in brief. Before starting the cooperation game, a player who is playing a game in the host game machine 1 inputs a cooperation game execution instruction for requesting the player who is playing the same game in the other game machine to participate in the cooperation game in a scene of the game which host player is playing through an operation of the operational switch 14. In this case, the operational switch 14 is request input means. Receiving this instruction, the CPU core 21 of the host game machine 1 produces information of requesting the guest player to participate in the cooperation game ("the cooperation game request information" hereinafter) according to the game program that is executing at present (in this case, role playing game program), and transmits such information to outside through the transmitting portion 291 of the wireless interface 29 together with transmission source information of one's own game machine 1 (addressed to unspecified). In this case, the CPU core 21 and the transmitting portion 291 of the wireless interface 29 are cooperation request information producing and transmitting means.

The receiving portion 291 of the wireless interface 29 of the guest game machine 2 (strictly speaking, no guest game machine 2 at such a point of time) receives the cooperation game request information. Receiving such information, the CPU core 21 of the guest game machine 2 informs the player of the guest game machine 2 that the outside game machine 1 has inputted the cooperation game request information according to the game program which the guest game machine 2 is executing (the same game program with the host game machine, of course) on a display, such as the LCD 11 and 12. This notification is displayed together with the transmission source information of the host game machine 1 from which the cooperation game request information was outputted, so that the player of the guest game machine 2 easily knows from which player the cooperation game request information was outputted. Especially, in a case where the players of the respective game machines 1, 2 are acquainted with each other and the respective players have already registered names which have been respectively registered in the respective game machines in memories of the respective game machines as identification codes for the respective game machines 1, 2, it is possible to easily specify the game machine 1 of the transmission source by comparing the identification code registered in the memory and the inputted transmission source information through the CPU core 21 according to the game program. In this case, the receiving portion 291 of the wireless interface 29, the CPU core 21 and the display, such as the LCD 11 and 12 are cooperation request information inputting and displaying means.

The player of the guest game machine 2 reviews the participation in the cooperation game which participation was requested based on the cooperation game request information and transmission source information displayed on the display. If the player of the guest game machine 2 participates in the cooperation game, the player inputs an instruction of acceptance of the participation offer of the cooperation game through the operational switch 14 of the guest game machine 2 that is acceptance input means. Receiving this instruction, the CPU core 21 of the guest game machine 2 produces information of acceptance of the participation of the cooperation game according to the game program ("the cooperation game acceptance information" hereinafter), and returns such information to the host game machine which outputted the cooperation game request information through the transmission portion 292 of the wireless interface 29 together with the transmission source information of one's own game machine 2. Concurrently, the guest game machine 2 stores the identification code which is shown in the transmission source information of the host game machine 1 which outputted the cooperation game request information in a memory together with a flag showing the host game machine. In this case, the CPU core 21 and the transmitting portion 292 of the wireless interface 29 are cooperation game acceptance information returning means.

The host game machine 1 receives the cooperation game acceptance information from the guest game machine 2 through the wireless interface 29 together with the transmission source information. The CPU core 21 of the host game machine 1 acknowledges through the game program that the guest game machine 2 shown in the transmission source information accepted the participation in the cooperation game, and stores an identification code shown in the transmission source information of the guest game machine 2 which outputted the cooperation game request information in a predetermined game participant memory with a flag showing the acceptance of the participation in the cooperation game. Thereafter, the respective game machines start progress of the cooperation game.

When the cooperation game is started, present information which shows a progressing state of a present game stored in a predetermined memory of the host game machine 1 (similar in the guest game machine 2) according to the game program of the host game machine 1, that is, a space-time parameter, is read out and is transmitted from the host game machine 1 to the guest game machine 2. The above-mentioned present information are a virtual time to be used at least in the game that is time based upon Noon-Night time axis and season time axis and information showing a coordinate position of the player character in the virtual space in the host game machine 1.

The host game machine 1 executes the cooperation game as a continuation of the standalone game that is executing at this time according to the game program, and a development of the scenario of the game is controlled through the CPU core 21 so as to succeed before and after the cooperation game. On the other hand, the guest game machine 2 is controlled according to the game program in such a way that the guest game machine 2 enters the game that is progressing in the host game machine 1 so as to play the cooperation game based on the present information transmitted from the host game machine 1. In other words, the game is of course progressing in the guest game machine under a game progressing state different from one of the host game machine. But, the cooperation game is executed by temporarily stopping the game progressing state of the guest game machine and temporarily corresponding the game progressing state of the guest game machine with one of the host game machine.

Thereafter, until finish of the corresponding game, each CPU core 21 of the game machines 1, 2 adjusts the positional relation between the player character and the other player characters to be operated by the respective game machines 1, 2 and a passage of the virtual time between the respective game machines in such a way that the information regarding the position of the player character in the virtual space and the virtual time is periodically exchanged between the respective game machines through the wireless interface 29 according to each game program, and the information regarding the position of the player character in the virtual space and the virtual time stored in each memory is renewed.

The cooperation game finishes in such a way that the host player inputs a cooperation game finish command through an operation of an input portion of the host game machine 1, such as the operational switch 14, and the CPU core 21 produces a declaration of finish of the cooperation game according to the game program, and such a declaration is outputted to each guest game machine 2 which participates in the cooperation game through the wireless interface 29. Alternatively, the cooperation game finishes in such a way that each of all guest game players who participate in the cooperation game inputs the cooperation game finish command through the operation of the input portion of the guest game machine 2, such as the operational switch 14, and each CPU core 21 produces the declaration of finish of the cooperation game according to the game program, and such a declaration is outputted to the host game machine 1 through the wireless interface 29. It is not necessary for all guest players to simultaneously take such a way. The cooperation game finishes at a time when all guest players who play the cooperation game while connecting with the host game machine 1 disappear with a passage of time. When the cooperation game finishes, the host game machine 1 transfers to the standalone game, maintaining a progressing state of the finished cooperation game. On the other hand, the guest game machine 2 that finished the cooperation game transfers to the standalone game in the progressing state just before the participation in the cooperation game. As mentioned hereinafter, predetermined parameters are maintained even in the guest game machine 2 that played the cooperation game as a participant also after finish of the cooperation game.

When the cooperation game request information is transmitted from the host game machine 1 and the guest game machine 2 receives such information, in the standalone game that is executing in the guest game machine 2, the guest player may get the guest player character to do shopping, or to battle, for instance. When the guest game machine 2 is in such a situation, the guest player is invited to select whether or not the guest player accepts a start of the cooperation game after waiting a settlement of such a situation.

In other words, in each guest game machine 2, the CPU core 21 judges according to the game program whether or not the game machine 2 is in a state that the game machine 2 can participate in the cooperation game according to the game program as the guest game machine 2, and realtimely stores a participation ability in a proper memory as a participation ability flag. That is, an immediate start of the cooperation game at a time when the player character does shopping or battles against an enemy character on a scenario development of the game program may induce an interference on the scenario progress. For this reason, the CPU core 21 stores "NO" as the participation ability flag in the memory while the player character is taking such an action. In such a state that the other player character can immediately start the cooperation game, the CPU core 21 stores "YES" as the participation ability flag in the memory. Whenever the player character takes some action in the game scenario, the cooperation game participation ability flag which is preset for such an action is read out in the game program and contents of such participation ability flag is stored in the memory, so that the CPU core 21 of the guest game machine 2 easily judge as to whether or not the player character is in such a state that the player can start the cooperation game at the present stage at any time by referring to the participation ability flag in the memory.

If the participation ability flag of the player character of the guest game machine 2 that received the cooperation game request information from the host game machine 1 is "NO" at the time when receiving such cooperation game request information, the CPU core 21 does such a process that notice of being inputted of the cooperation game request information from the external game machine 1 to the player of the guest game machine 2 on the display is postponed until the player character takes the other action along the game scenario according to the game program and the participation ability flag is rewritten in "YES". In such a case, Step S105 of the game program and the CPU core 21 are participation ability judging means and display postponing means.

If the host game machine 1 is executing a predetermined event when transmitting the cooperation game request information from the host game machine 1, the CPU core 21 of the host game machine 1 produces event execution information showing the host game machine 1 is executing a predetermined event according to the game program and transmits the produced information to the guest game machine together with the cooperation game request information. Receiving both information, the CPU core 21 of the guest game machine 2 that transmitted the cooperation game acceptance information reads the predetermined event shown in the event execution information inputted by the host game machine 1 according to the game program out of the game program during execution, and executes the predetermined event, similar to the host game machine 1.

The event in this case means a scenario process to be executed when it is necessary to notify the player of some information through a game image, such as a movie, voice and a text as a premise of the execution of the game scenario in each scene. For instance, the event in the scene where a story based on some legend is set means to introduce the legend to the player by representation of a movie, voice or a text. In addition, the event in the scene where an important non player character appears means to enter the image of the non player character in the game.

When transferring from the standalone game to the cooperation game, a perfect continuation exists between the last standalone game and the cooperation game in the host game machine 1, but there is no such continuation in the guest game machine 2. For this reason, if the cooperation game immediately starts in the guest game machine 2, it is anticipated that the player of the guest game machine 2 is difficult to deal with the cooperation game immediately started. Then, the CPU core 21 of the guest game machine 2 reads a cooperation game switch image out of the game program so as to display on the display and informs the player of the guest game machine 2 that the cooperation game will start from now on before starting the cooperation game as the guest game player according to the game program. Concretely speaking, a screen on the LCD 11, 12 where the player character exists at a coordinate position in the standalone game is gradually whited out, and the screen of the cooperation game is whited in.

Figure 3:
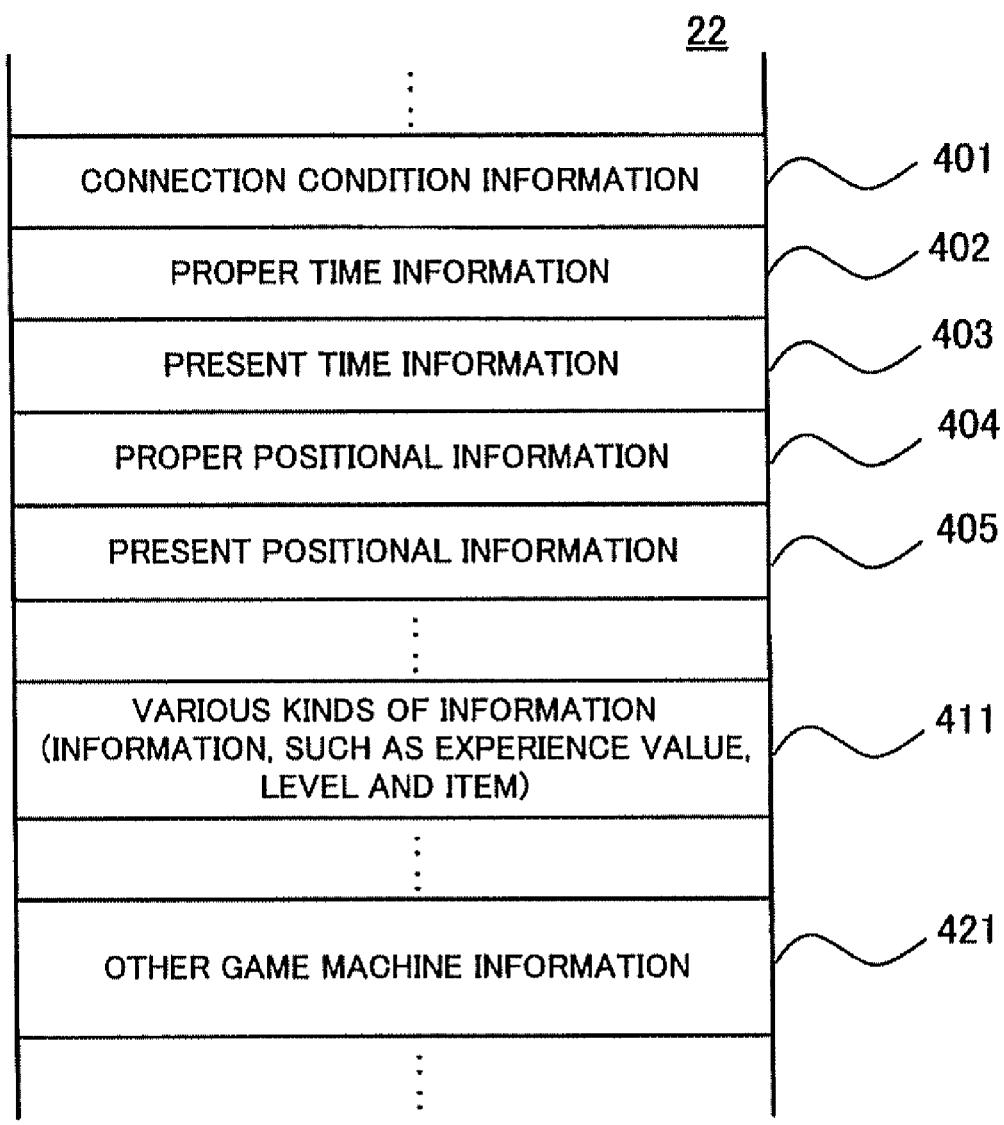
FIG. 3 is a view showing a structure of various kinds of information stored in WRAM 22.

Subsequently, data necessary for the progress of the game in this embodiment is mentioned. FIG. 3 shows data in connection with a game system in this embodiment, and shows a structure of changeable data in connection with the transfer between the standalone game and the cooperation game, which are stored in the WRAM 22 according to the game program. The WRAM 22 stores connection condition information 401, proper time information 402, present time information 403, proper positional information 404 and present positional information 405 as data in connection with a game situation ("the game state data" hereinafter). In addition, player character parameter information 411 is also stored therein as information of the player character of the game machine. Furthermore, other game machine information 421 for storing information in connection with the other game machines 1, 2 is also stored therein if a progressing game is the cooperation game.

Firstly, the connection condition information 401 includes information regarding the other game machines 2, 1 that are in a communication connection state if the games that respectively progress transfer from the standalone games to the cooperation games and the games progress as the cooperation game. The connection condition information 401 also includes information as to whether the other game machine 2, 1 that are in communication connection condition or the game machine 1, 2 having WRAM 22, in which such information 401 is stored, is the host game machine 1 or the guest game machine 2, and furthermore, includes information as to whether the game presently executed in the game machine is the standalone game or the cooperation game.

The proper time information 402 is information showing a virtual time in an original game which is progressed in the game machines 1, 2 (the game excluding the cooperation game in which a player participates as the guest player), and the present time information 403 is information showing a virtual time that passes in the game which is presently progressed in the game machine 2 (the cooperation game if the player participates in the cooperation game as the guest player).

In a case where the game advances as the standalone game, information of passage of a virtual time which is used in the game in the host game machine 1 and the guest game machine 2 in the standalone game is stored in the proper time information 402 and the present time information 403. Both information is concurrently renewed with a passage of the virtual time by the same information. In a case where the game advances as the cooperation game, the game scenario continues in the host game machine 1 without interruption irrespective of occurrence of the cooperation game by the player, and then, both information is renewed by the same virtual time information, similar to the case where the game advances as the standalone game. That is, even if the game executed in the host game machine 1 is the standalone game or the cooperation game, the same virtual time is stored in the proper time information 402 and the present time information 403 of the host game machine 1 so as to be renewed with the progress of the scenario without interruption. This is natural since the scenario continuously advances in the host game machine 1 irrespective of the occurrence of the cooperation game.

On the other hand, the proper time information 402 and the present time information 403 play a role as a time stamp at a time of switching between the standalone game and the cooperation game according to the game program. In other words, at the time of transfer to the cooperation game of the guest game machine 2, the present time information 403 of the guest game machine 2 is renewed by the same information as the present time information 403 of the host game machine 1, and, thereafter is continuously renewed at a constant pace by the host game machine 1 when the progressing game is the cooperation game. By doing so, the present time information 403 of the host game machine 1 and the guest game machine 2 always shows the same virtual time, and a game world in the same time state parallel advances in all game machines 1, 2 by controlling the game scenario of each game machine 1, 2 based upon the same virtual time in all game machines 1, 2, that is, based upon the present time information 403.

On the other hand, the proper time information 402 of the guest game machine 2 fixedly stores the virtual time in the guest game machine 2 just before the transfer to the cooperation game, that is, the information just before the transfer to the cooperation game. When the cooperation game finishes and the standalone game advances in the guest game machine 2 again, the proper time information 402 storing the information just before the transfer to the cooperation game is loaded as the present time information 403 through the CPU core 21 according to the game program. And, the proper time information 402 and the present time information 403 are renewed according to the scenario progress of the restarted standalone game, that is, according to the passage of the virtual time of the game world, synchronizing both information.

The proper positional information 404 is information showing a position of the player character in the virtual space in the game machine 1 or 2 in an original game which progresses in the game machine 1 or 2, that is, in such a state that the game program executes the game excluding the cooperation game to be executed as the guest game machine. The present positional information 405 is one showing the position of the player character in connection with the game machine 1, 2 in the virtual space in the game presently executed in the game machine 1, 2. That is, the proper positional information 404 and the present positional information 405 that are set in a memory in the game machine 1, 2 through the CPU core 21 according to the game program are set so as to play the cooperation game at a position in the independent virtual space in each game machine 1, 2, regardless of the position of the player character in the virtual space in the standalone game which has been played in each game machine 1, 2. Then, the scenario progress of the game in the standalone condition is interrupted due to the participation in the cooperation game, and the position of the player character is also changed in the virtual space thereby, which is useful for the guest game machine 2. For the host game machine 1 where the game scenario continues without an interruption irrespective of occurrence of the cooperation game by the player, the position of the player character in the virtual space is not changed before or after the start of the cooperation game, so that there is no meaning on control processes.

The proper positional information 404 and the present positional information 405 store the position in the virtual space where the player character exists when the game progresses as the standalone game, and both information is concurrently renewed based upon a movement of the player character by the same information according to each game program. When the game advances as the cooperation game, both information is renewed in the host game machine 1, similar to the case where the game advances as the standalone game.

On the other hand, in the guest game machine 2, the present positional information 405 is renewed into the information showing a position near the position of the player character of the host player based on the present positional information 405 in the host game machine 1 at the time of the transfer to the cooperation game. Thereafter, only present positional information 405 is renewed through the operation by the guest player in a state that the progressing game is the cooperation game, and the proper positional information 404 is stored, keeping the information just before the transfer to the cooperation game. That is to say, the cooperation game is executed in cooperation with both player characters of the host game machine 1 and the guest game machine 2 in the guest game machine 2 in such a way that the virtual space the same as one where the player character of the player of the host game machine 1 has existed is produced inside the guest game machine 2 according to the game program, and the player characters of the host player and the guest player are respectively located in the virtual space. In the cooperation game at the host game machine 1, the player character of the guest player is located in the virtual space of the host game machine 1 where the player character has existed in the last standalone game, and both player characters take actions in such a virtual space in cooperation with both players.

If the player character of the player of the guest game machine 2 keeps the position in the virtual space in the last standalone game at the time of start of the cooperation game, the guest game player can not participate in the cooperation game since the position in the virtual space where the cooperation game is executed is near the position in the virtual space where the player character of the host game machine 1 has existed. Therefore, the positional information of the player character in the virtual space just before the start of the cooperation game is stored and kept in the proper positional information 404 in the guest game machine 2 according to the game program before starting the cooperation game, and the present positional information 405 is separately used as the positional information for the cooperation game. And, the position near the position in the virtual space where the player character of the host player exists is set and stored as the present positional information 405.

Thereafter, the present positional information 405 controls the position of the player character of the guest player in the host game machine 2 in the virtual space in the subsequent cooperation game. By doing so, it is possible to individually control the position of the player character of the guest player in both standalone game state and cooperation game state in the guest game machine 2. When the cooperation game finishes and the standalone game starts in the guest game machine 2 again, the present positional information 405 is renewed by the information of the proper positional information 404 storing the information just before the transfer into the cooperation game.

The player character parameter information 411 is information that changes due to results of actions which causes the player character to take, excluding the positional information of the player character in the virtual space, such as experience value information, level information and item information ("the player character parameter" hereinafter), and information regarding appearances of the player character in the virtual space. The player character parameter information 411 is renewed according to the progress of the game in the standalone game or in the cooperation game (regardless of the host player or the guest player).

If the player character wins the battle with an enemy character, the experience value of the player character is added and increases the level one by one when reaching a predetermined value. The information regarding the appearances of the player character in the virtual space is changed due to a change of the item, such as an arm and a protector, that the player character wears. Such player character parameter information 411 is not changed based upon the transfer between the standalone game and the cooperation game.

The other game machine information 421 is information stored in a case where the progressing game is the cooperation game, and information for associating with the other game machines 1, 2 being in communication connection state by the connection condition information 401, the player character parameter information 411 regarding the other game machines 1, 2, and the present positional information 405 stored in other game machine which shows a coordinate position of the other player character in the virtual space are stored therein. Such other game machine information 421 is used for locating the player character of the other game machine in the same virtual space together with the player character in the cooperation game, for example.

Processes to be executed in the host game machine 1 and the guest game machine 2 according to the game program in the game system in this embodiment are now mentioned. In order to easily understand exchange of information between the game machines 1, 2, the following explanation is mentioned on the assumption that one guest player participates in the cooperation game in response to an invitation of the participation of the cooperation game by the host game player and such a cooperation game advances between only both machines. In the following explanation, one game machine is the host game machine 1 and other game machine is the guest game machine 2. But, the game machine that is the guest game machine 2 in this case may be the host game machine 1 in other scene and the game machine that is the host game machine 1 may be the guest game machine 2 in other scene.

The host player and the guest player are differentiated from each other in the cooperation game, but in this embodiment, the host player and the guest player in the cooperation game are differentiated from each other even in the standalone game before or after the cooperation game.

The processes by the CPU core 21 according to the game program at the time when the progressing game transfers from the standalone game to the cooperation game, when the cooperation game is being executed and when the progressing cooperation game transfers to the to the standalone game again, are now mentioned, referring to the flowchart in FIG. 4.

When an operation for sending the cooperation game request information (corresponds to declaration of the cooperation game) is inputted in the host game machine 1 where the game advances as the standalone game, whether or not the standalone game in the host game machine 1 has execution of a predetermined event, that is, whether or not a predetermined event is presently being executed or will immediately start at the present time (when sending the cooperation game request information) in the host game machine 1 is judged (Step S101). The CPU core 21 makes this judgment according to the game program by referring to the event execution flag in the WRAM 22. Generally, the scenario that progresses according to the game program has many event processes in order to send information necessary for the progress of the game to the player through game images, and the CPU core 21 makes a predetermined event execution flag in memory means, such as the WRAM 22, "during execution" if such an event is to be executed on a scenario development, and controls not to receive the input operation from the player through the input portion in order to smoothly execute the event processes. In this case, Step S101 and the CPU core 21 are event judging means.

If the CPU core 21 judges by referring to the event execution flag that the standalone game at this point of time has the execution of a predetermined event, the CPU core 21 of the host game machine 1 ("the host CPU core 21-1" hereinafter) executes a process for giving priority to finish of the execution of the event in the game progress of the host game machine 1 (Step S102). But, the event is not executed again if the execution of the event already finished.

If the event is executed (or such execution already finished), the host CPU core 21-1 sends such information that a predetermined event is being executed in the host game machine 1 (or such execution already finished) ("the predetermined event execution information" hereinafter) to the guest game machine 2 together with the cooperation game request information through the transmitting portion 292 ("the host transmitting portion 292-1" hereinafter) of the wireless interface 29 ("the host wireless interface 29-1" hereinafter) (Step S103). On the other hand, if the judgment is not that the game progress has the execution of the predetermined event in Step S101, the host CPU core 21-1 sends the cooperation game request information having no predetermined event execution information to the guest game machine 2 through the host transmitting portion 292-1 (Step S104).

When the host game machine 1 sends the cooperation game request information and the receiving portion 291 ("the guest receiving portion 291-2" hereinafter) of the wireless interface 29 ("the guest wireless interface 29-2" hereinafter) in the guest game machine 2 receives such information in Step S103 or Step S104, the CPU core 21 in the guest game machine 2 ("the guest CPU core 21-2" hereinafter) judges whether or not the guest player character does shopping or battles, that is, judges contents of the participation ability flag in the memory of the guest game machine 2 (Step S105).

If the participation ability flag is "NO" due to during shopping and during battle, the judgment of Step S105 is repeated until the participation ability flag becomes "YES" after shopping or battle. If the participation ability flag becomes "YES" and the judgment is not that the guest player character is doing shopping or battling (or there is no such judgment at the present stage), the guest CPU core 21-2 sends the cooperation game acceptance information to the host game machine 1 by the transmitting portion 292 ("the guest transmitting portion 292-2" hereinafter) of the guest wireless interface 29-2 if the operation for sending the cooperation game acceptance information of the guest player (which corresponds to acceptance of the participation) is inputted (Step S106).

When the receiving portion 291 ("the host receiving portion 291-1" hereinafter) of the host wireless interface 29-1 in the host game machine 1 receives the cooperation game acceptance information, the host CPU core 21-1 sends the present time information 403 and the present positional information 405 at this point of time (space time parameters of the player character) ("the host present information" hereinafter) which are stored in the WRAM 22 in the host game machine 1 ("the host WRAM 22-1" hereinafter) to the guest game machine 2 by the host transmitting portion 292-1 (Step S107). Such host present information is stored in the other game machine information 421 of the WRAM 22-2 of the guest game machine 2. If the host present information is sent, the host CPU core 21-1 renews the connection condition information 401 stored in the host WRAM 22-1 so as to include such information that the game advances in the cooperation game under the cooperation of the guest game machine 2, that is, the cooperation game is being executed at the present time (Step S108). In other words, such information that the cooperation game is being executed is stored in the memory, and the host game machine 1 is switched from the execution state of the last cooperation game to the execution state of the cooperation game. By doing so, the host game machine 1 is just switched from the standalone game state to the cooperation game state. In this case, Step S108, the host CPU core 21-1 and the host WRAM 22-1 are cooperation game progress switching means.

On the other hand, when the guest CPU core 21-2 receives the host present information by the guest receiving portion 291-2, the connection condition information 401 stored in the WRAM 22 in the guest game machine 2 ("the guest WRAM 22-2" hereinafter) is renewed so as to include such information that the game advances in the cooperation game under the cooperation of the host game machine 1 (Step S109). That is, such information that the cooperation game is being executed is stored in the memory, and the guest game machine 2 is switched from the last standalone game execution state to the cooperation game execution state. By doing so, the guest game machine 2 is just switched from the last standalone game state to the cooperation game state. In this case, Step S109, the guest CPU core 21-2 and the guest WRAM 22-2 are cooperation game progress switching means.

Subsequently, the guest CPU core 21-2 corresponds the present time information 403 for advancing the cooperation game stored in the guest WRAM 22-2 with the present time information 403 of the host present information by the host present information received and stored in the other game machine information 421, that is, corresponds the virtual time of the virtual world of the guest game machine 2 with the virtual time of the virtual world of the host game machine 1, and such information is renewed thereby. In addition, the world coordinate position of the host player character is stored in the other game machine information 421 based upon the present positional information 405 showing the world coordinate position of the host player character of the host game machine. At the same time, in order to position the guest player character near the host player character in the virtual space, the coordinate position near the world coordinate position of the host player character is computed, and the computed world coordinate position is stored in the present positional information 405 of the WRAM 22 of the guest game machine 2 as the world coordinate position of the player character of the guest game machine according to the game program (Step S110).

By doing so, both player characters of the host player and the guest player can be located in the virtual space of the guest game machine 2, holding such a virtual space in common. The thus computed coordinate position in the cooperation game of the player character of the host game machine 1 is transmitted to the guest game machine 1, and is stored in the other game machine information 421 of the guest game machine 1 as the other machine present information. Then, the guest player character and the host player character can be displayed on displays of the guest game machine 2 and the host game machine 1. That is, the player character in connection with one's own game machine is displayed on the display based upon the present positional information 405, and the player character in connection with other game machine is displayed based upon the other machine present information of the other game machine information 421 in the respective game machines 1 and 2.

When the position of the guest player character operated in the guest game machine 2 in the virtual space is changed near the position where the host player character exists in Step S110, the display on the LCD 11, 12 in the guest game machine 2 is changed from the virtual space where the guest player character exists into the virtual space in the neighborhood of the host player character. In addition, the difference between the host game machine 1 and the guest game machine 2 is also changed according to the game program. For example, a season displayed in the guest game machine 2 is changed into one of the host game machine 1. In such a display change, the CPU core 21 gradually whites out the display on the LCD 11, 12 by the cooperation game switching image read out of the game program, and the display of the virtual space on the LCD 11, 12 before the change is whited, and is gradually whited in so as to display the virtual space after change, as mentioned before. Various image switching forms can be adopted as cooperation game switching forms, and various kinds of forms, such as whiteout/whitein, fadeout/fadein and mosaicout/mosaicin can be adopted. By the image swithing of Step S110, the game of the guest game machine 2 is switched from the last standalone game into the cooperation game.

Subsequently, the guest CPU core 21-2 judges whether or not the guest receiving portion 291-2 receives predetermined event execution information (Step S111). If the receipt of the predetermined event execution information is judged, the guest CPU core 21-2 reads the event the same as one which the host game machine 1 executes in Step S102 out of the game program, and executes such an event in the guest game machine 2 (Step S112). In case of execution of a predetermined event in Step S112, stationary images and/or moving images matching such a predetermined event are displayed on the displays LCD 11, 12 of the guest game machine 2. By such a process, the same event is almost synchronously executed in the host game machine 1 and the guest game machine 2.

The host CPU core 21-1 which renewed the connection condition information 401 stored in the WRAM 22-1 in Step S108 and the guest CPU core 21-2 which did not judge receipt of a predetermined event execution information in Step S111 or executed a predetermined event in Step S112 judge whether or not the player inputted movement operation of the player character (Step S121 and Step S131). In Step S121 and Step S131, whether or not the player inputted movement operation of the player character, that is, the player character of each player moved in each virtual space in each game machine 1, 2 is judged by referring to and comparing a computed position of the player character in the virtual space of each game machine 1, 2 and the positional information stored in the present positional information 405 with each other.

That is, in the host game machine 1, the CPU core 21-1 computes the position (world coordinate) of the player character that is operated by the host player in the virtual space (virtual world) according to the game program, and realtimely stores such a position in a predetermined register that is a memory. Similarly, in the guest game machine 2, the CPU core 21-2 computes the position (world coordinate) of the player character operated by the guest player in the virtual space (virtual world), and stores such a position in a predetermined register that is a memory according to the game program. Then, the CPU core 21-1 of the host game machine 1 is possible to judge as to whether or not the player character has been moved in the virtual space of the host game machine 1 by the host player by comparing the present position of the player character stored in the register and the present position of the player character stored in the present positional information 405. Similarly, the CPU core 21-2 of the guest game machine 2 is possible to judge as to whether or not the player character has been moved in the virtual space of the guest game machine 2 by the guest player by comparing the present position of the player character stored in the register and the present position of the player character stored in the present positional information 405. Such a process is a basic function of the game program for detecting the position of the player character and renewing the positional information 404, 405 realtimely, regardless of an existence of the start of the cooperation game in the game machines 1, 2.

If the judgment is that the player characters of the corresponding players have been moved in the respective virtual spaces in the respective game machines 1, 2, the host CPU core 21-1 and the guest CPU core 21-2 renew the present positional information 405 respectively stored in the WRAM 22 into values stored in the registers of the respective game machines 1, 2 in order to give an influence of the change of the positions of the player characters (Step 122 and Step S132). In this case, Step 121, Step S131, the CPU core 21 and the WRAM 22 are present information renewal means. Besides, the host CPU core 21-1 renews the proper positional information 404 stored in the host WRAM 22-1 by the information similar to one renewed in the present positional information 405 (Step S124).

Subsequently, the host CPU core 21-1 and the guest CPU core 21-2 which renewed the present positional information 405 stored in the WRAM 22 exchange respective present positional information 405 through the receiving portion 291 and the transmitting portion 292 (Step S124). In this case, Step S123, the CPU core 21, the transmitting portion 292 of the wireless interface 29 are character position transmitting means. By receiving such present positional information, the other machine present information of the other game machine information 421 of the host game machine 1 or the guest game machine 2 is renewed. In the game machine 1 or 2, the position in the virtual space of the player character in connection with the player who operates the game machine can be computed by the game program through the CPU core 21, but the position in the virtual space of the game machine 2 or 1 of the player character of the player of the game machine 2 or 1 which executes the cooperation game, connecting with one's own game machine can not be computed. For this reason, if the coordinate position in the virtual space of one's own player character was computed, the computed coordinate position in the virtual space of one's own player character is transmitted to all game machines that execute the cooperation game, being connected with one's own game machine, and the coordinate position in the virtual space of one's own player character stored in the other machine present information of the other game machine information 421 of all the other game machines is rewritten an renewed. By this process, it is possible to obtain and store the coordinate position information in the virtual space of the player characters of all players who participate in the cooperation game in all game machines respectively connected without differentiating the host and the guest from each other.

When the judgment is not that the movement of the player character was inputted in Step S121 or after renewal of the proper positional information 404 stored in the host WRAM 22-1 in Step S124, the host CPU core 21-1 clocks a passage time in the virtual world during the cooperation game based upon the time clocked by its internal timer, and renews the time. In other words, the present time information 403 for the cooperation game that is stored in the host WRAM 22-1 is renewed (Step S125). In this case, Step S125, the host CPU core 21-1, the internal timer, and the host WRAM 22-1 are present time renewal means. Besides, the host CPU core 21-1 renews the proper time information 402 stored in the host WRAM 22-1 by the renewed present time information 403 (Step S126). Subsequently, the renewed present time information 403 is transmitted to the guest game machine 2 by the host transmitting portion 292-1 (Step S127). In this case, Step S127, the CPU core 21 and the transmitting portion 292 of the wireless interface are present time transmitting means.

When the judgment is not that the movement of the player character was inputted in Step S131 or each present positional information 405 is transmitted and received in Step S123, the guest CPU core 21-2 receives the present time information 403 stored in the host WRAM 22-1 transmitted in Step S127 by the guest receiving portion 291-2, and the present time information 403 stored in the guest WRAM 22-2 is renewed thereby (Step S137). Then, the present time information 403 of all guest game machines 2 connected with the host game machine 1 is renewed, corresponding with the present time information 403 of the host game machine 1, and all guest game machines 2 connected with the host game machine 1 can execute the cooperation game based on the time information shown in the present time information 403, holding the present time information 403 of the host game machine 1 in common. Therefore, all game machines respectively connected with each other can synchronously execute the cooperation game.

The cooperation game is thus progressed in the host game machine 1 in such a way that the CPU core 21 produces one's own player character and the player characters of the other game machines that participate in the cooperation game in the virtual world (the virtual space) of the host game machine 1 based on the space time parameters stored in the WRAM 22-1, and the produced player characters are displayed on the displays, such as the LCD 11 and 12, through the VRAM 23, 25 according to the game program. Since polygon data or so for producing the image of the player character itself is stored in the game program of each game machine 1, 2, the CPU core 21 easily produces the images of the host player and the guest player. In case of the cooperation game, many player characters are displayed at the same time. In order to differentiate the player characters from each other, display parameters between the player character of the host game machine and the player character of the other game machine which participates in the cooperation game, such as transparency, display multiplier, brightness of color and saturation, may be changed so as to differentiate both from each other so that display forms are different in the player character of the host game machine and the player character of the other game machine which participate in the cooperation game. In this case, the CPU core 21, the WRAM 22, the VRAM 23, 25 and the LCD 11, 12 in each game machine are cooperation game execution means.

The host CPU core 21-1 which transmitted the present time information in Step S127 judges whether or not the cooperation game finished (Step S128). In this case, the cooperation game finishes if the host player or the guest player executes an operation for finish of the cooperation game, the game machines 1 and 2 separate from each other by a predetermined distance, or mutual wireless communication through the wireless interface 29 is impossible for a predetermined time due to an existence of an interference between the game machines 1 and 2, for example.

If the judgment by the CPU core 21-1 according to the game program is not that the cooperation game finished in Step S128, the host CPU core 21-1 returns the process to Step S121, again. If the judgment in Step S128 is that the cooperation game finished, the host CPU core 21-1 renews the connection condition information 401 stored in the host WRAM 22-1 into such information that the game advances as the standalone game (Step S129). The standalone game to be executed succeeding the cooperation game thereafter is executed in the host game machine 1. When the host game machine 1 transfers to the standalone game, the CPU core 21-1 of the host game machine 1 deletes the positional information of the player character of the guest player in the other game machine information 421. Then, the player character of the guest player in the virtual space in the host game machine 1 is deleted, and the display of the player character of the guest player which has been displayed on the display also disappears, and only the player character of the host player is displayed. In the afore-mentioned state, the host player starts the game in the standalone state. The host player can continue the game with no feeling of physical disorder even if the cooperation game finished since the scenario development of the host game machine 1 according to the game program continues before and after the cooperation game and during the execution of the cooperation game without interruption irrespective of the existence of the cooperation game, as mentioned before.

On the other hand, the guest CPU core 21-2 that renewed the present time information 403 stored in the guest WRAM 22-2 in Step S137 judges whether or not the cooperation game finished (Step S138). If the finish of the cooperation game is not judged, the guest CPU core 21-2 returns the process to Step S131, again. If the finish of the cooperation game is judged in Step S139, the guest CPU core 21-2 renews the connection condition information 401 stored in the guest WRAM 22-2 into such information that the game advances as the standalone game (Step S139).

Subsequently, in Step S139, the connection condition information 401 stored in the guest WRAM 22-2 is renewed, and the guest CPU core 21-2 renews the present time information 403 stored in the guest WRAM 22-2 by the proper time information 402 storing the virtual time in the game in the guest game machine 2 just before start (switch) of the cooperation game, and renews the present positional information 405 by the proper positional information 404 storing the position of the player character in the virtual space in the guest game machine 2 just before start (switch) of the cooperation game (Step S140). Thereafter, the standalone game is executed in the guest game machine 2 from a state just before the transfer to the cooperation game.

When the guest game machine 2 transfers to the standalone game, the CPU core 21-2 of the guest game machine 2 loads the position of the player character in the virtual space in the guest game machine 2 just before the start (switch) of the cooperation game as positional information in the present positional information 405. Then, a game scene is displayed, returning to a scene at a time when the guest player transmitted the cooperation game acceptance information to the host game machine 1. Needless to say, the positional information of the player character of the host player which has been stored in the other game machine information 421 is also deleted, and the scene just before the switch into the cooperation game appears again on the display.

The player of the guest game machine 2 can restart the game with the position of the player character and the time just before the start of the cooperation game since the virtual time in the game in the guest game machine 2 just before the start (switch) of the cooperation game is loaded to the present time information 403 of the guest game machine 2. Then, the guest player can restart the game with no feeling of physical disorder even after the finish of the cooperation game, continuing with the cooperation game although the scenario development of the guest game machine 2 according to the game program was temporarily interrupted by the cooperation game.

Figure 5:
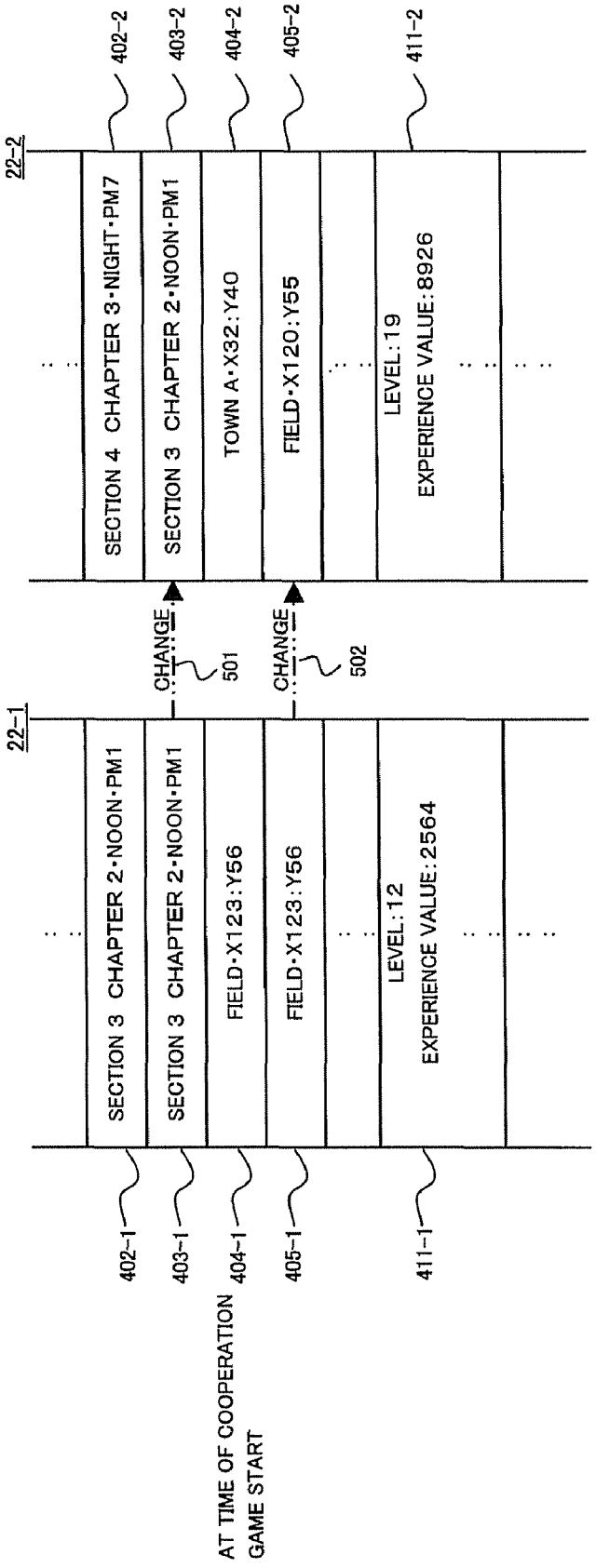
FIG. 5 is an example showing changes of game situation data stored in WRAM 22.
Figure 5:
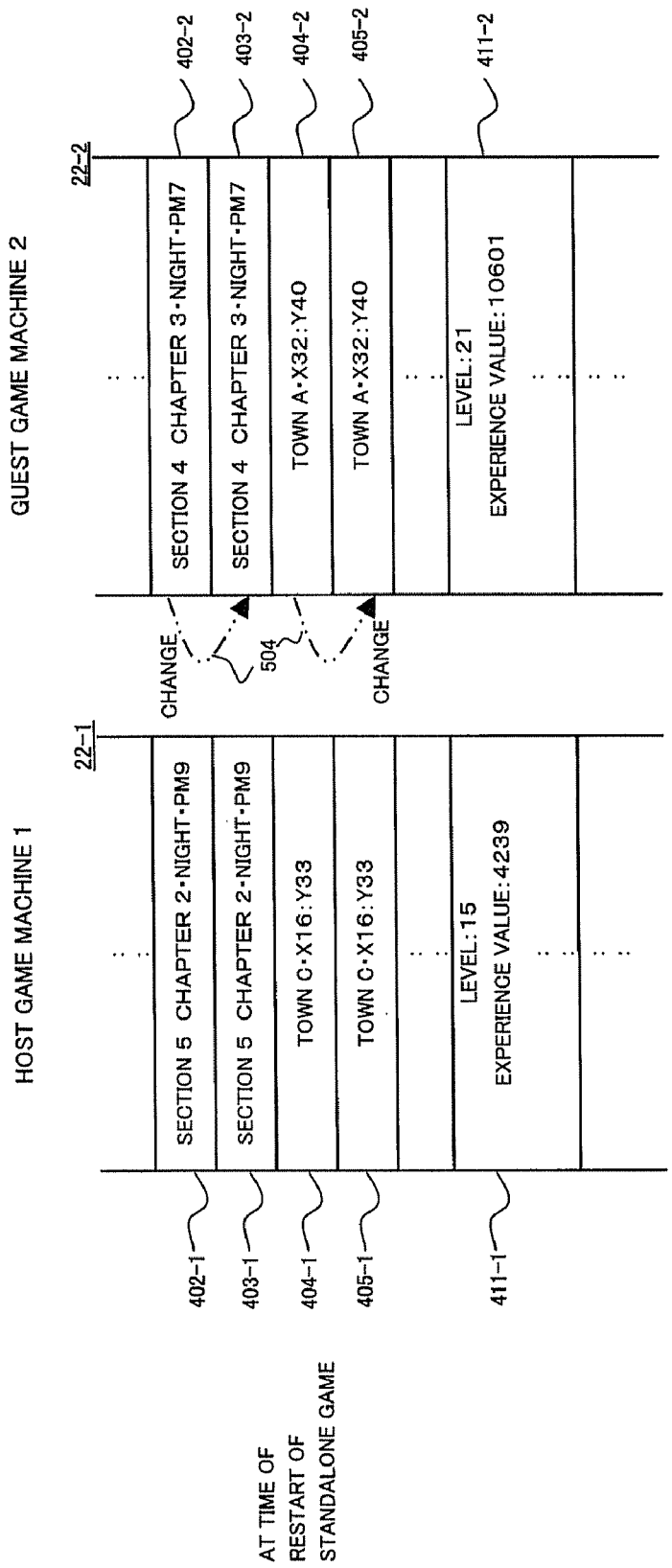

The progress of the game in connection with the processes by the CPU core 21 is not mentioned, referring to examples. FIG. 5 shows an example in the change of game condition data stored in the WRAM 22 of the game machines 1, 2 and the player character parameter information 411 due to the transfer from the standalone game to the cooperation game. In a case where the advancing game is the standalone game (FIG. 5(*a*)), the players individually play the games in the host game machine 1 and the guest game machine 2, and the game condition data and the player character parameter information 411 stored in the host WRAM 22-1 and the guest WRAM 22-2 are respectively different from each other, of course.

When the game is transferred from the standalone game to the cooperation game (FIG. 5(*b*)), the present time information 403-2 of the guest WRAM 22-2 is changed by the same information as one in the host WRAM 22-1 (501), and the present positional information 405-2 of the guest player character is changed by the information where the host player character exists near the guest player character in the virtual space (502).

In a case where the advancing game is the cooperation game (FIG. 5(*c*)), in the game condition data of the host WRAM 22-1, the proper time information 402-1, the present time information 403-1, the proper positional information 404-1 and the present positional information 405-1 are renewed by the same information, similar to the case where the game advances as the standalone game. On the other hand, in the guest WRAM 22-2, the present time information 403-1 of the host WRAM 22-1 is also used for the cooperation game in common, so that the present time information 403-2 is changed by the present time information 403-1 of the host WRAM 22-1 (503), and only present positional information 405-2 showing the position of the player character of the guest player in the cooperation game is changed through the operation by the guest player. Besides, the player character parameter information 411-1, 411-2 in the game machines 1, 2 is changed according to a degree of the progress of the cooperation game.

When the game is transferred from the cooperation game to the standalone game again (FIG. 5(*d*)), the game condition data is maintained as it is in the host WRAM 22-1. On the other hand, in case of the transfer into the cooperation game, in the guest WRAM 22-2 the present time information 403-2 and the present positional information 405-2 are respectively changed by the proper time information 402-2 and the proper positional information 404-2 which have store the game condition data just before the transfer into the cooperation game (504).

When the standalone game advances in the guest game machine 2 again, the virtual time of the standalone game and the position of the guest player character in the virtual space return to the state just before advancing the cooperation game. But, the player character parameter information 411-2 which was changed at the time of the progress of the cooperation game is not changed into the condition before the start of the cooperation game in the standalone game after finish of the cooperation game. In other words, the player character parameter information 411-2 is changed by only result of actions to be taken by the player character in the game progress in either case, the standalone game or the cooperation game.

When starting the game, each standalone game separately advances in the game machines 1, 2 to be operated by each player, which are used in the game system in this embodiment, as mentioned before. At this time, the game condition data stored in the WRAM 22 of the game machines 1, 2 is separately renewed in each game machine 1, 2. These players selects one host game machine 1 among two or more game machines 1, 2 which advance the standalone games and determines the remaining as the guest game machines 2, and these are reciprocally connected. By doing so, it is possible to transfer the advancing game from the standalone game to the cooperation game where the player characters operated by the respective players are respectively located in the virtual spaces in the other game machines, and the game advances such that the player characters of two or more players cooperate with each other in the respective game machines.

But, the host game machine 1 and the guest game machine 2 completely independently execute the standalone game at the time of the transfer from the standalone game to the cooperation game, and a degree of the progress in each game, that is, the position of the player character in the virtual space and the game time are different. If the cooperation game starts in such a state, the difference between the host game machine 1 and the guest game machine 2 may occur during the progress of the game.

On the contrary, in the game system in this embodiment, the present information in the game that has been advanced in the host game machine 1, such as the position of the player and the game time, is transmitted to the guest game machine in the host game machine 1 at the time of the transfer from the standalone game to the cooperation game.

In the guest game machine 2, the present time information 403 and the present positional information 405 stored in the guest WRAM 22-2 are renewed based upon the received host present information of the host game machine 1 when transferring the advancing game into the cooperation game. The present time information 403 stored in the guest WRAM 22-2 is renewed by the game condition data periodically received from the host game machine 1 until finish of the cooperation game. Then, it is possible to transfer the game into the cooperation game with no difference in connection with the game progress.

At the time of transfer from the standalone game to the cooperation game, the game condition data stored in the host WRAM 22-1 in the host game machine 1 is not changed as well as direct data. Then, the host player is possible to advance the game with the guest player in the cooperation game, being successive to the standalone game that has been advanced by himself (herself). The host player thus obtains funs of a network game in which two or more players participate, perfectly maintaining continuation in the game progress.

If in the game that is a RPG, an experience value or a level as the player character information 411 that is an index for determining strength of the player character against an enemy in the game is raised according to a degree of the progress, the CPU core 21 controls through the game program according to the game progress to renew the player character parameter information 411 in either standalone game or cooperation game (regardless of the player, the host player or the guest player). Therefore, the host player and the guest player can improve the parameter, such as the experience value and the level of each player character also by participating in the cooperation game. Besides, the game progress of the host game machine 1 is not restricted by time or space in the standalone game. That is, it is possible for the host player to obtain the cooperation by the guest player, keeping a continuation in the game progress even at the time of the transfer of the game into the cooperation game.

In the game condition data stored in the guest WRAM 22-2 in the guest game machine 2, the present time information 403 and the present positional information 405 stored in the WRAM 22 in all game machines 1 and 2 that participate in the cooperation game are renewed based upon the information in the host WRAM 22-1 when the advancing game transfers to the cooperation game. Concretely speaking, the time of game the same as the host game machine 1 is set, and the position of the player character is moved near the player character of the host game machine 1. Then, the difference in the game progress does not occur.

The player character parameter information 411 in the guest game machine 2 is not changed from one in the standalone game that has been executed even at the time of transfer into the cooperation game. For this reason, some degree of continuation in the game progress is maintained even in the guest game machine 2.

When the cooperation game finished, the guest game machine 2 respectively renews the present time information 403 and the present positional information 405 by the proper time information 402 and the proper positional information 404 that are kept in a state just before transferring the advancing game into the cooperation game. By doing so, the standalone game after finish of the game progress in the cooperation game in the guest game machine 2 can be restarted from the state just before the transfer into the cooperation game.

Then, the guest player can assist the game progress progressed by the host player in the host game machine 1 without receiving an influence from the other players in one's own game progress. Besides, the player character parameter 411 including the experience value in connection with the guest player character is controlled to be changed through the CPU core 21 based upon the scenario development of the game according to the game program regardless of the execution state of the game, the standalone game or the cooperation game, so that the guest player also obtains benefit due to the participation in the cooperation game.

When the advancing game transfers from the standalone game to the cooperation game, the CPU core 21-2 firstly renews the present positional information 405 stored in the guest WRAM 22-2 according to the game program based upon the present positional information received from the host game machine 1, and the guest player character can be moved near the host player character which the cooperation game executes in the virtual space. Then, the guest player can immediately assist the game progress for the host player even if the position of the guest player character is far from the position of the host player character in the virtual space at the time when the advancing the game is the standalone game.

When the advancing game transfers from the standalone game to the cooperation game, whether or not the guest player character does shopping or battles in the virtual space at the present stage in the game progress of the guest game machine 2 can be judged by referring to the participation ability flag in the guest game machine 2. Then, the guest game machine 2 can transfer the advancing game to the cooperation game after waiting disappearance of such a situation. By doing so, the guest game player can start the cooperation game without receiving accidental matters, such as interruption of shopping or battle in the standalone state.

When the game transfers from the standalone game to the cooperation game in the host game machine 1 in such a state that a predetermined event is executed in the standalone game, information in connection with the predetermined event can be also transmitted together with the present time information 403 and the present positional information 405 to be transmitted at the time of the transfer into the cooperation game which are stored in the host WRAM 22-1. Then, the predetermined event can be executed in the guest game machine 2 based upon the information received from the host game machine 1 at the time when the game progressing through the CPU core 21-2 according to the game program transfers into the cooperation game. Even in a case where such an event is not executed, effects by WhiteIN or WhiteOUT can be displayed on the LCD 11, 12 of the guest game machine 2 at a time of change of the image displayed due to the transfer of the advancing game.

By doing so, it is possible to reduce a feeling of physical disorder to a change of the game image displayed on the LCD 11, 12 of the guest game machine 2 that the guest player may have due to a change of the game condition in the guest game machine 2 at the time of the transfer of the game advancing as mentioned above. Besides, an event generally assists understanding of the game progress. If a predetermined event in connection with the cooperation game is generated at the time of the start of the cooperation game in the guest game machine 2, it is possible to reduce the feeling of physical disorder of the guest player and to give more game funs to the guest player in comparison with a case where the event is not executed since an event generally assists understanding of the game progress.

The above-mentioned embodiments are not limiting, and can be transformed into various forms, and various kinds of applications are possible. Some transformations of the above-mentioned embodiments that can be applied to the invention are now mentioned.

In the game system in the above-mentioned embodiment, one host player and one guest player play the game, but two or more guest players may play the cooperation game. At this time, the host game machine 1 transmits the present time information 403 stored in the host WRAM 22-1 to each of two or more guest game machines 2, and the present positional information 405 stored in the WRAM 22 is exchanged between the host game machine 1 and two or more guest game machines 2. On the other hand, only each present positional information 405 is exchanged between two or more guest game machines 2. Alternatively, the host game machine 1 may receive the present positional information 405 from each guest game machine 2, functioning as a server of this cooperation game, and thereafter the host game machine 1 may transmit the present positional information 405 of the respective guest game machines 2 to each guest game machine 2 together with one's own present time information 403.

In the above-mentioned embodiment, the wireless communication method between the game machines 1 and 2 is peer-to-peer connection one, but these may be respectively connected by a network communication through a server.

Besides, if the guest player character of the guest game machine 2 is doing shopping or battling with an enemy, the cooperation game acceptance information is transmitted after waiting the finish of such an action in order to transfer the advancing game into the cooperation game in the above-mentioned embodiment, but the cooperation game acceptance information may be compulsorily transmitted during a battle excluding such a case where the battle is one with so-called "boss". Besides, the cooperation game acceptance information may be compulsorily transmitted even during the battle with so-called boss if the standalone game in the host game machine 1 is in a predetermined situation, such as a case where the cooperation game request information is transmitted due to an occurrence of the predetermined event.

In the game system in the above-mentioned embodiment, the transmission of the cooperation game request information in connection with the process of the CPU core 21 in Step S104 as shown in FIG. 4 means the transmission of information for requesting the guest player to participate in the cooperation game. But, the host present information to be transmitted in Step S107 may be transmitted in Step S104 together with such cooperation game request information and the host present information may be stored in the guest WRAM 22-2 until the process of Step S110.

In a case where the guest game machine 2 receives the cooperation game request information and the host present information during a battle with an enemy character, the cooperation game acceptance information may be transmitted to the host game machine 1 after finish of such battle. And, the guest game machine 2 transmits the cooperation game acceptance information after finish of the battle, and the present time information 403 and the present positional information 405 may be renewed based upon the present information that has been received during the battle.

In the above-mentioned embodiment, the host game machine 1 judges as to whether or not an event is being executed (or has been executed) when transmitting the cooperation game request information, and if the judgment is that the event is executed, such information that the event is being executed is transmitted to the guest game machine 2. In other words, if a scene according to a position of the player character is to be set after finish of a predetermined event, being at a position according to the scene shows a necessity of the event. In such a case, such information that an event is being executed may not be transmitted although only the present information is transmitted from the host game machine 1 to the guest game machine 2. In the guest game machine 2, the CPU core 21-2 may judge as to whether or not the position according to the present information transmitted from the host game machine 1 is the position where the event is executed through the game program, and the event may be independently executed when transferring to the cooperation game.

In the above-mentioned embodiment, effects, such as WhiteIN and WhiteOUT, are displayed when changing the display on the LCD 11, 12 in the guest game machine 2 at the time of the transfer from the standalone game to the cooperation game. But, an image before change may be changed into an image after change in such a way that a back face of the image before change is overlapped with the image after change, and the image before change is gradually transparentized.

In order to make the player to understand the state of the game progress and conversations between the characters in the game that is a RPG, a text is displayed on the display, such as the LCD 11, 12 of the game machines 1, 2. Such information that the game is now transferred into the cooperation game may be displayed in the guest game machine 2, making use of the text when transferring the advancing game to the cooperation game.

The above-mentioned display effect or display by a text on the LCD 11, 12 of the guest game machine 2 due to the transfer of the advancing game may be used also in a case where the cooperation game is transferred to the standalone game again. In a case where predetermined effects and texts are displayed in either time, the time of the transfer from the standalone game to the cooperation game and the time of the transfer from the cooperation game to the standalone game, the cooperation game in that the player participates as the guest player may be one in a dream world of the player character, and the display effect or text display may be "having a dream" or "awake from a dream" through the CPU core 21 according to the game program.

In the above-mentioned embodiment, there is little merit of the cooperation game for the guest player excluding improvement of the player character parameter information 411 even in the cooperation game. On the contrary, information in connection with scenes in the cooperation game as the guest player including results of the cooperation game may be stored in the WRAM 24 of the game machine 2 through the CPU core 21 according to the game program, and scenario progress may be controlled in such a way that when the scenario of the game advances just before such a scene, the execution of such a scene is omitted and the scenario is advanced to a next scene. By doing so, the player can actually feel such a meaning of the participation in the cooperation game having a scene that is not yet captured as the guest player.

In such a case, such a message that the player has participated in the cooperation game which was held by another player and has cleared the scene may be displayed on the first LCD 11 and/or the second LCD 12. In the case where the cooperation game in which the player participate as the guest player is a world of a dream of the player character, a text "a dream at that time was an actual world" may be displayed.

Besides, the CPU core 21 may temporarily improve a predetermined parameter, such as the level of the player character, through the game program when the game is advanced in a scene where the player participated in the cooperation game in the past. Then, it is possible to present such a state that the player easily captures the game due to a past experience in a scene where the player once experienced. Similarly, if the player participates in the cooperation game having a scene that has already been cleared in the standalone game as the guest player, a predetermined parameter, such as a level of the player character, may be temporarily improved.

In the above-mentioned embodiment, when the game returns to the standalone game after participation in the cooperation game as the guest player, the value that has been renewed in the cooperation game is kept as the player character parameter information 411. But, if a viability value (called as "HP" in many games) of the player character of the player character parameter information 411 becomes zero or anything unusual occurs in a status, the player character may be possible to continue the game.

Then, the player character parameter information 411 just before the participation in the cooperation game as the guest player may be stored in the WRAM 22 similar to the proper time information 402 and the proper positional information 404, and if the player character is impossible to continue the cooperation game that the player participates in as the guest player, the CPU core 21 may change the player character parameter information 411 in a condition just before the participation in the cooperation game according to the game program. Alternatively, if the player character is impossible to continue the game, such a control is possible that the player character parameter information is read out of the WRAM 22 through the CPU core 21 according to the game program, and the player character is returned to the standalone game, reducing such a value by a predetermined value. Then, even if the player character is impossible to continue the game in the cooperation game, the game can be progressed, returning the game to the standalone game with no inconvenience.

The above-mentioned embodiment referred to the execution of the game system according to the invention in the game machine 1, 2 having two displays, such as the first LCD 11 and the second LCD 12, and a pointing device, such as the touch panel 13. But, it may be possible to execute the game to which the invention is applied in a computer excluding the game machines 1, 2 as long as such a computer has at least the display on which game images are displayed and the input device through which a player can input instructions. In addition, the computer for executing the game system to which the invention is applied may be a machine dedicated for games or a general purpose machine, such as a personal computer, and may be a portable machine or a stationary machine. Besides, a mobile phone can be applied as the computer for executing the game to which the invention is applied.

In the above-mentioned embodiment, program and data in connection with the game system are distributed, being stored in the game cartridge 17. If the game machines 1, 2 are connected with an external server machine which is on a network so as to communicate therebetween, the program and data in connection with the game system may be stored in a fixed disk unit which the server has, and may be distributed to the game machines 1, 2 through the network. On this occasion, the program and data received by the wireless interface 29 from the server in the game machines 1, 2 may be stored in a rewritable ROM which is installed on the game machines 1, 2 (not shown, such as a flash memory) or in the cartridge 17 having such a ROM, and may be loaded into the WRAM 22 at the time of execution.

The above-mentioned storage medium for storing the program and data is not limiting, but an optical disc device and/or a magnetic disc device, such as a flexible disk, a CD-ROM and a DVD-ROM, may be applied according to forms of computers which are platforms. If a computer having a fixed disc device is a platform, the program and data may be distributed, being stored in a fixed disc device in advance.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. A game machine for playing a predetermined game individually or in cooperation with two or more game machines that are connected with each other so as to communicate therebetween, comprising:

virtual world producing means, for producing a virtual world for a game in a virtual space in a memory, space time parameter which is comprised of a world coordinate and a virtual time being set in said virtual world;

scenario advancing means, for advancing a scenario by moving a player character operable by a player in response to a signal from input means in said virtual world;

said scenario advancing means having standalone execution means and cooperation game execution means, said standalone execution means for executing a standalone game where said scenario of said game is advanced alone by said game machine, and said cooperation game execution means for executing a cooperation game where said scenario of said game is advanced in cooperation with one's own game machine and the other game machine connected with said one's own game machine so as to communicate with each other by exchanging game information between said game machine and said other game machine through mutual communication;

memory means, for storing a coordinate position of said player character in said virtual space and a virtual time at this point of time as present information;

present position renewal means, for computing said coordinate position of said player character in said virtual space during execution of said game and renewing said present information of said player character stored in said memory means;

character position transmitting means, for transmitting said coordinate position of said player character in said virtual space during execution of said cooperation game to the other game machine which is executing said cooperation game;

1) in a case where said game machine is a host game machine which requests the other guest game machine to execute said cooperation game at a time of execution of said cooperation game by said cooperation game execution means, said host game machine subsequently further comprising:

request input means, through which an instruction to request said other game machine to execute said cooperation game is inputted;

cooperation request information producing and transmitting means, for producing cooperation request information based on said inputted instruction to request to execute said cooperation game and transmitting said information to two or more other game machines connected so as to communicate;

present information reading and transmitting means, for reading said coordinate position of said player character and said virtual time stored in said memory means at a first point of time when receiving cooperation game acceptance information showing acceptance of participation in said cooperation game from said other game machine and transmitting said read information to said other game machine;

first cooperation game advance switching means, for storing in a memory information showing that said game machine is executing said cooperation game with said other game machine from which said cooperation game acceptance information was returned, and switching said game machine from the last standalone game execution state into a cooperation game execution state;

first present time renewal means, for clocking said virtual time during execution of said cooperation game and renewing said present information stored in said memory means;

present time transmitting means, for transmitting said renewed virtual time to said other game machine which is executing said cooperation game;

2) in a case where said game machine is a guest game machine which participates in said cooperation game requested by said other host game machine at a time of execution of said cooperation game by said cooperation game execution means, said guest game machine subsequently further comprising:

cooperation request information input display means, for receiving said cooperation request information transmitted from said other game machine and displaying information showing that said cooperation request information was inputted by said other game machine on a display;

acceptance input means, through which an instruction of acceptance of participation in said cooperation game is inputted in response to said received cooperation request information of said cooperation game;

cooperation game acceptance information producing and returning means, for producing cooperation game acceptance information based on said inputted instruction of acceptance, and retuning said produced information to said other game machine;

virtual time renewal means, for renewing said present information of said memory means by said virtual time at said first point of time, which was received from said other game machine to which said cooperation game acceptance information was transmitted;

other machine present position renewal means, for storing said coordinate position of said player character of said other game machine at said first point of time which is transmitted by said present information reading and transmitting means at a time of execution of said cooperation game, in said memory means as other machine present information, and renewing said other machine present information based on said coordinate position of said player character of said other game machine which is transmitted from character position transmitting means of said other game machine during execution of said cooperation game;

character position setting means, for computing and setting a coordinate position where said player character of said game machine should be displayed in said cooperation game based on said coordinate position of said player character of said other game machine at said first point of time, and for storing said computed position in said present information in said memory means;

second cooperation game advance switching means, for storing in said memory information showing that said game machine is executing said cooperation game with said other game machine to which said cooperation game acceptance information was transmitted, and switching said game machine from the last standalone game execution state into said cooperation game execution state; and second present time renewal means, for renewing said present information stored in said memory means based on said virtual time which is transmitted from said present time transmitting means of said other game machine;

wherein said cooperation game execution means displays both player characters of said host game machine and said guest game machine which participate in said cooperation game on said displays of said game machines based on said respective coordinate positions of said present information and said other machine present information, and thereafter said player character of said game machine is controlled in its position to be displayed based on said present information and said player character of said other game machine is controlled in its position to be displayed based on said other machine present information, and controls said virtual time in said cooperation game based on said present information.

2. The game machine according to claim 1, further comprising:

cooperation game finish judging means, for judging as to whether or not said cooperation game finished;

in a case where said game machine is said guest game machine which participates in said cooperation game requested by said other game machine:

space time parameter storing means for storing said coordinate position of said player character and said virtual time of said game machine in said standalone game execution state just before transfer of said game machine into said cooperation game execution state through said second cooperation game progress switching means; and loading means, for loading said coordinate position of said player character and said virtual time just before transfer stored in said space time parameter storing means into said memory means as said present information in a case where said cooperation game judging means judged finish of said cooperation game;

wherein said standalone execution means advances said game scenario after finish of said cooperation game based on said present information into which said coordinate position of said player character and said virtual time just before transfer have been loaded.

3. The game machine according to claim 1, wherein said character position setting means sets a coordinate position where said player character of said game machine should be displayed in said cooperation game near said coordinate position of said player character transmitted from said other game machine.

4. The game machine according to claim 1, wherein:
in a case where said game machine is said guest game machine which participates in said cooperation game requested by said other host game machine, said guest game machine subsequently further comprising:
participation ability judging means for judging as to whether or not said game machine is able to participate in said cooperation game as said guest game machine at a present stage, and storing substantially in real time an ability of participation as a participation ability flag; and
display postponing means for controlling to postpone a display of such information that said cooperation request information has been inputted on said display through said cooperation request information input display means until said participation ability flag is rewritten in "YES" in a case where said participation ability flag is "NO".

5. The game machine according to claim 1, further comprising:
memory means, for storing an event execution flag showing whether or not said game machine is executing a predetermined game event according to said game scenario;
1) in a case where said game machine is said host game machine which requests said other guest game machine to execute said cooperation game, said host game machine subsequently further comprising:
event judging means, for judging as to whether or not said game machine is executing said predetermined event by referring to said event execution flag in said memory means when said cooperation request information producing and transmitting means transmits said cooperation request information to said other game machine;
wherein said cooperation request information producing and transmitting means can transmit predetermined event execution information together with said cooperation request information in a case where said event judging means judged that said game machine is executing said predetermined event;
2) in a case where said game machine is said guest game machine which participates in said cooperation game requested by said other host game machine, said guest game machine subsequently further comprising:
event executing means for controlling to execute said predetermined event based on said predetermined event execution information inputted from said other game machine also in said game machine when said second cooperation game advance switching means switches said game machine from the last standalone game execution state to said cooperation game execution state.

6. A computer-readable non-transitory storage medium for getting a computer to play a predetermined game individually or in cooperation with two or more computers that are connected with each other so as to communicate therebetween:
said computer-readable non-transitory storage medium for making said computer to function as following means:
virtual world producing means, for producing a virtual world for a game in a virtual space in a memory, space time parameter which is comprised of a world coordinate and a world time being set in said virtual world;
scenario advancing means, for advancing a scenario by moving a player character operable by a player in response to a signal from input means in said virtual world;
said scenario advancing means having standalone execution means and cooperation game execution means, said standalone execution means, for executing a standalone game where said scenario of said game is advanced alone by said computer, and said cooperation game execution means, for executing a cooperation game where said scenario of said game is advanced in cooperation with one's own computer and the other computer connected with said one's own computer so as to communicate with each other by exchanging game information between said computer and said other computer through mutual communication;
memory means, for storing a coordinate position of said player character in said virtual space and a virtual time at this point of time as present information;
present position renewal means, for computing said coordinate position of said player character in said virtual space during execution of said cooperation game and renewing said present information of said player character stored in said memory means;
character position transmitting means, for transmitting said coordinate position of said player character in said virtual space during execution of said cooperation game to the other computer which executes said cooperation game;
1) in a case where said computer is a host computer which requests the other guest computer to execute said cooperation game at a time of execution of said cooperation game by said cooperation game execution means, said computer-readable non-transitory storage medium further making said host computer to function as following means:
request input means, through which an instruction to request said other computer to execute said cooperation game is inputted;
cooperation request information producing and transmitting means, for producing cooperation request information based on said inputted instruction to request to execute said cooperation game and transmitting said information to two or more other game machines connected so as to communicate;
present information reading and transmitting means, for reading said coordinate position of said player character and said virtual time stored in said memory means at a first point of time when receiving cooperation game acceptance information showing acceptance of participation in said cooperation game from said other computer and transmitting said read information to said other game machine;
first cooperation game advance switching means, for storing in a memory information showing that said computer is executing said cooperation game with said other computer from which said cooperation game acceptance information was returned, and switching said computer from the last standalone game execution state into a cooperation game execution state;
first present time renewal means, for clocking said virtual time during execution of said cooperation game and renewing said present information stored in said memory means;
present time transmitting means, for transmitting said renewed virtual time to said other computer which is executing said cooperation game;
2) in a case where said computer is a guest computer which participates in said cooperation game requested by said other computer at a time of execution of said cooperation game by said cooperation game execution means; said computer-readable non-transitory storage medium further making said computer as following means:

cooperation request information input display means, for receiving said cooperation request information transmitted from said other computer and displaying information showing that said cooperation request information was inputted by said other computer on a display;

acceptance input means, through which an instruction of acceptance of participation in said cooperation game is inputted in response to said received cooperation request information of said cooperation game;

cooperation game acceptance information producing and returning means, for producing cooperation game acceptance information based on said inputted instruction of acceptance, and retuning said produced information to said other computer;

virtual time renewal means, for renewing said present information of said memory means by said virtual time at said first point of time, which was received from said other computer to which said cooperation game acceptance information was transmitted;

other machine present position renewal means, for storing said coordinate position of said player character of said other computer at said first point of time which is transmitted by said present information reading and transmitting means at a time of execution of said cooperation game, in said memory means as said other machine present information, and renewing said other machine present information based on said coordinate position of said player character of said other computer which is transmitted from character position transmitting means of said other computer during execution of said cooperation game;

character position setting means, for computing and setting a coordinate position where said player character of said computer should be displayed in said cooperation game based on said coordinate position of said player character of said other computer at said first point of time, and for storing said computed position in said present information in said memory means;

second cooperation game advance switching means, for storing in said memory information showing that said computer is executing said cooperation game with said other computer to which said cooperation game acceptance information was transmitted, and switching said computer from the last standalone game execution state into said cooperation game execution state; and second present time renewal means, for renewing said present information stored in said memory means based on said virtual time which is transmitted from said present time transmitting means of said other computer;

wherein said cooperation game execution means displays both player characters of said host computer and said guest computer which participate in said cooperation game on displays of said computers based on said respective coordinate positions of said present information and said other machine present information, and thereafter said player character of said computer is controlled in its position to be displayed based on said present information and said player character of said other computer is controlled in its position to be displayed based on said other machine present information, and control said virtual time in said cooperation game based on said present information.

* * * * *